(12) United States Patent
Higashi

(10) Patent No.: US 9,241,091 B2
(45) Date of Patent: Jan. 19, 2016

(54) IMAGE PROCESSING DEVICE, IMAGE PROCESSING METHOD, AND COMPUTER PROGRAM

(71) Applicant: EIZO Corporation, Ishikawa (JP)

(72) Inventor: Masafumi Higashi, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 14/437,344

(22) PCT Filed: Jul. 3, 2013

(86) PCT No.: PCT/JP2013/068226
§ 371 (c)(1),
(2) Date: Jul. 14, 2015

(87) PCT Pub. No.: WO2014/064968
PCT Pub. Date: May 1, 2014

(65) Prior Publication Data
US 2015/0312442 A1    Oct. 29, 2015

(30) Foreign Application Priority Data

Oct. 22, 2012  (JP) .................................. 2012-232995
Dec. 19, 2012  (JP) .................................. 2012-277302

(51) Int. Cl.
*G06K 9/40* (2006.01)
*H04N 1/409* (2006.01)
(Continued)

(52) U.S. Cl.
CPC ................ *H04N 1/409* (2013.01); *G06T 5/002* (2013.01); *H04N 5/142* (2013.01); *H04N 5/21* (2013.01);
(Continued)

(58) Field of Classification Search
CPC ........... G06T 5/001; G06T 5/20; G06T 5/004; G06T 7/0083; G06T 5/40; G06T 5/009; G06T 5/50; G06T 2207/20012; H04N 1/4092; H04N 7/26888; H04N 1/4097; G06K 9/40
See application file for complete search history.

(56) References Cited

U.S. PATENT DOCUMENTS

2004/0165785 A1    8/2004  Monobe et al.

FOREIGN PATENT DOCUMENTS

JP    2000331174 A    11/2000
JP    2003008898 A    1/2001
(Continued)

OTHER PUBLICATIONS

International Search Report dated Oct. 1, 2013 from corresponding International Application No. PCT/JP2013/068226; 4 pages.
(Continued)

*Primary Examiner* — Duy M Dang
(74) *Attorney, Agent, or Firm* — Maier & Maier, PLLC

(57) ABSTRACT

Provided are an image processing device, image processing method, and computer program which can accurately detect noise in an input image and eliminate or reduce the noise. A display device extracts a specific area including a target pixel from an input image and determines whether the boundary of noise is included in the specific area. If so determined, the display device performs filtering using a smoothing filter to smooth the target pixel. If not so determined, the display device performs filtering using an edge-preserving smoothing filter to smooth the target pixel. At this time, the display device determines whether to apply the result of the smoothing process using the edge-preserving smoothing filter, on the basis of the pixel values in the specific area, the result of the smoothing process using the edge-preserving smoothing filter, and the like.

14 Claims, 25 Drawing Sheets

(51) Int. Cl.
*H04N 5/21* (2006.01)
*H04N 5/14* (2006.01)
*G06T 5/00* (2006.01)
*H04N 19/117* (2014.01)
*H04N 19/136* (2014.01)
*H04N 19/182* (2014.01)
*H04N 19/86* (2014.01)

(52) U.S. Cl.
CPC ............ *H04N 19/117* (2014.11); *H04N 19/136* (2014.11); *H04N 19/182* (2014.11); *H04N 19/86* (2014.11); *G06T 2207/20012* (2013.01); *G06T 2207/20192* (2013.01)

(56) References Cited

FOREIGN PATENT DOCUMENTS

| JP | 2005117449 A | 4/2005 |
| JP | 2008153812 A | 7/2008 |
| JP | 4145665 B2 | 9/2008 |
| JP | 2009076973 A | 4/2009 |
| JP | 2009105990 A | 5/2009 |

OTHER PUBLICATIONS

Japanese Office Action dated Oct. 8, 2013 from corresponding Patent Application No. 2012-277302; 9 pgs.

FIG. 8
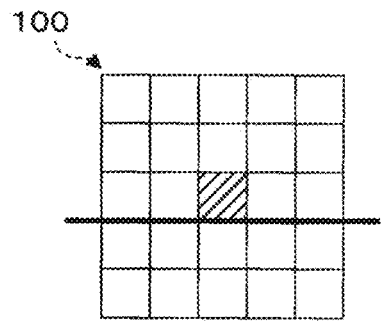
A. HORIZONTAL PATTERN
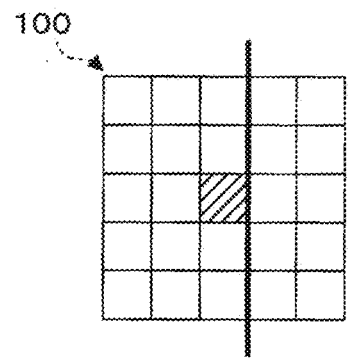
B. VERTICAL PATTERN
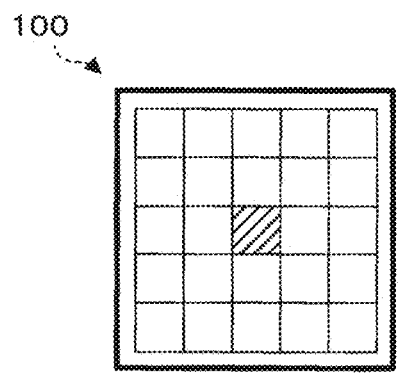
C. INTERNAL PATTERN
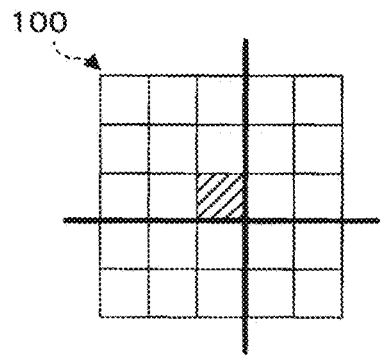
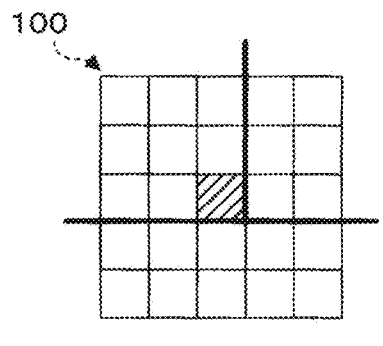
D. OTHER PATTERNS FIG. 10
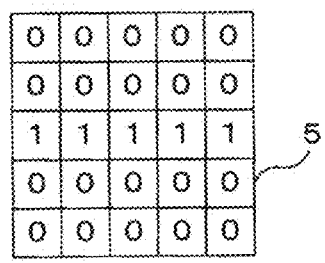
A. SMOOTHING FILTER (1) CORRESPONDING
TO VERTICAL PATTERN
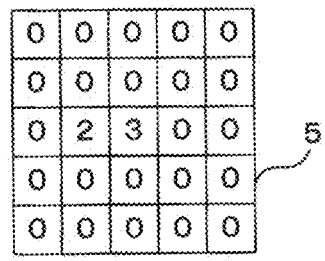
B. SMOOTHING FILTER (2) CORRESPONDING
TO VERTICAL PATTERN
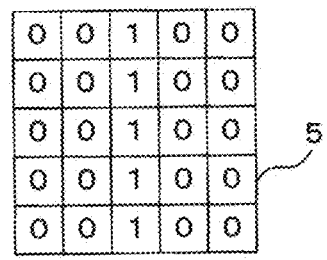
C. SMOOTHING FILTER CORRESPONDING
TO HORIZONTAL PATTERN FIG. 11
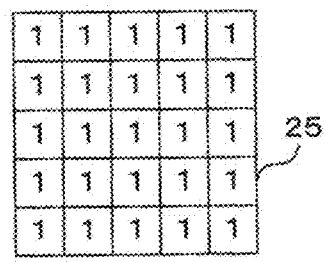
D. SMOOTHING FILTER CORRESPONDING
TO ANOTHER PATTERN
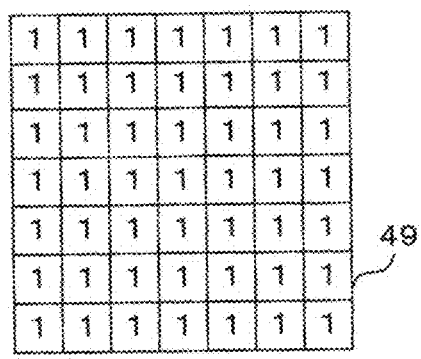
E. SMOOTHING FILTER WHEN SPECIFIC AREA
IS EXPANDED

FIG. 12

| 0 | 0 | 0 | 0 | 0 |
|---|---|---|---|---|
| 0 | 0 | 0 | 0 | 0 |
| 1 | 4 | 6 | 4 | 1 |
| 0 | 0 | 0 | 0 | 0 |
| 0 | 0 | 0 | 0 | 0 |

A. HORIZONTAL(0°)

| 0 | 0 | 0 | 0 | 1 |
|---|---|---|---|---|
| 0 | 0 | 0 | 4 | 0 |
| 0 | 0 | 6 | 0 | 0 |
| 0 | 4 | 0 | 0 | 0 |
| 1 | 0 | 0 | 0 | 0 |

B. DIAGONAL(45°)

| 0 | 0 | 1 | 0 | 0 |
|---|---|---|---|---|
| 0 | 0 | 4 | 0 | 0 |
| 0 | 0 | 6 | 0 | 0 |
| 0 | 0 | 4 | 0 | 0 |
| 0 | 0 | 1 | 0 | 0 |

C. VERTICAL(90°)

| 1 | 0 | 0 | 0 | 0 |
|---|---|---|---|---|
| 0 | 4 | 0 | 0 | 0 |
| 0 | 0 | 6 | 0 | 0 |
| 0 | 0 | 0 | 4 | 0 |
| 0 | 0 | 0 | 0 | 1 |

D. DIAGONAL(135°)

FIG. 13

| 0 | 0 | 0 | 0 | 0 |
|---|---|---|---|---|
| 0 | 0 | 0 | 2 | 1 |
| 0 | 2 | 6 | 2 | 0 |
| 1 | 2 | 0 | 0 | 0 |
| 0 | 0 | 0 | 0 | 0 |

E. DIAGONAL(22.5°)

| 0 | 0 | 0 | 1 | 0 |
|---|---|---|---|---|
| 0 | 0 | 2 | 2 | 0 |
| 0 | 0 | 6 | 0 | 0 |
| 0 | 2 | 2 | 0 | 0 |
| 0 | 1 | 0 | 0 | 0 |

F. DIAGONAL(67.5°)

| 0 | 1 | 0 | 0 | 0 |
|---|---|---|---|---|
| 0 | 2 | 2 | 0 | 0 |
| 0 | 0 | 6 | 0 | 0 |
| 0 | 0 | 2 | 2 | 0 |
| 0 | 0 | 0 | 1 | 0 |

G. DIAGONAL(112.5°)

| 0 | 0 | 0 | 0 | 0 |
|---|---|---|---|---|
| 1 | 2 | 0 | 0 | 0 |
| 0 | 2 | 6 | 2 | 0 |
| 0 | 0 | 0 | 2 | 1 |
| 0 | 0 | 0 | 0 | 0 |

H. DIAGONAL(157.5°)

FIG. 14

| 1 | 4 | 6 | 4 | 1 |
|---|---|---|---|---|
| 4 | 16 | 24 | 16 | 4 |
| 6 | 24 | 36 | 24 | 6 |
| 4 | 16 | 24 | 16 | 4 |
| 1 | 4 | 6 | 4 | 1 |

I. NO DIRECTION

FIG. 15

|  |  |  |
|---|---|---|
| −1 | 0 | 1 |
| −2 | 0 | 2 |
| −1 | 0 | 1 |

A. FOR HORIZONTAL (0°) DETERMINATION

|  |  |  |
|---|---|---|
| 0 | 1 | 2 |
| −1 | 0 | 1 |
| −2 | −1 | 0 |

B. FOR DIAGONAL (45°) DETERMINATION

|  |  |  |
|---|---|---|
| 1 | 2 | 1 |
| 0 | 0 | 0 |
| −1 | −2 | −1 |

C. FOR VERTICAL (90°) DETERMINATION

|  |  |  |
|---|---|---|
| 2 | 1 | 0 |
| 1 | 0 | −1 |
| 0 | −1 | −2 |

D. FOR DIAGONAL (135°) DETERMINATION

FIG. 21
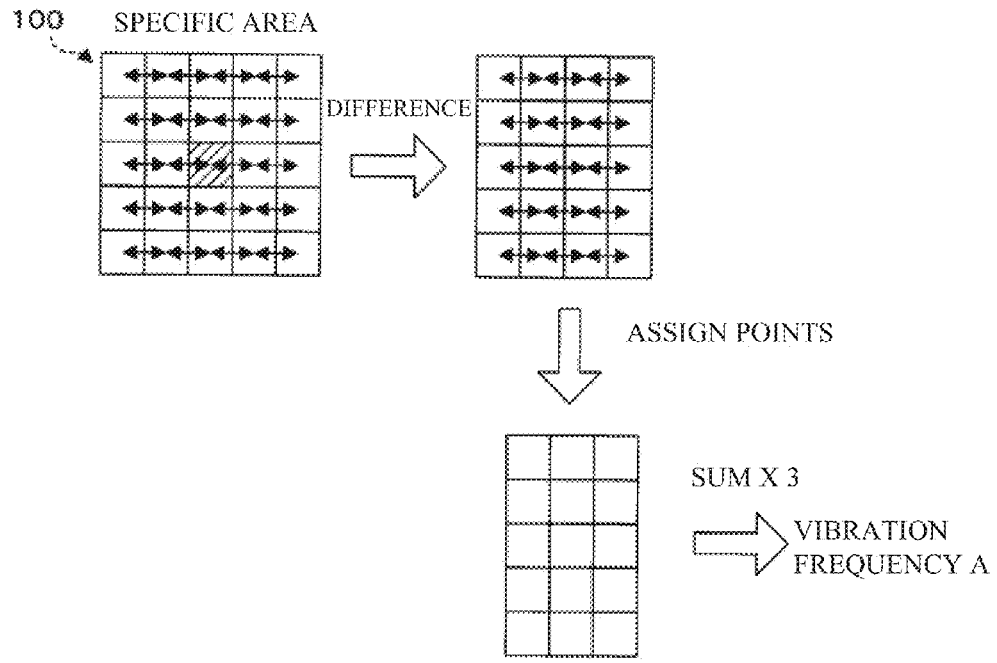
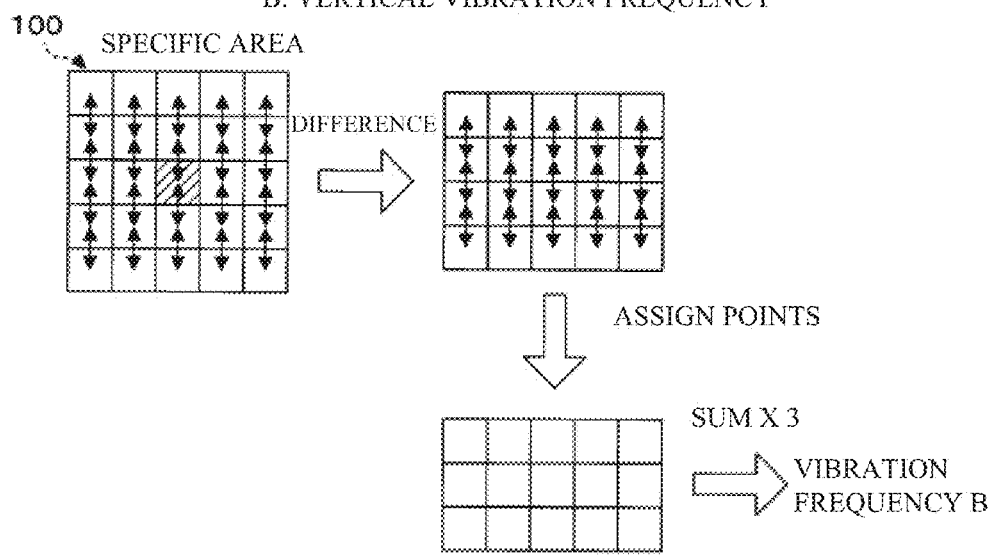

FIG. 22
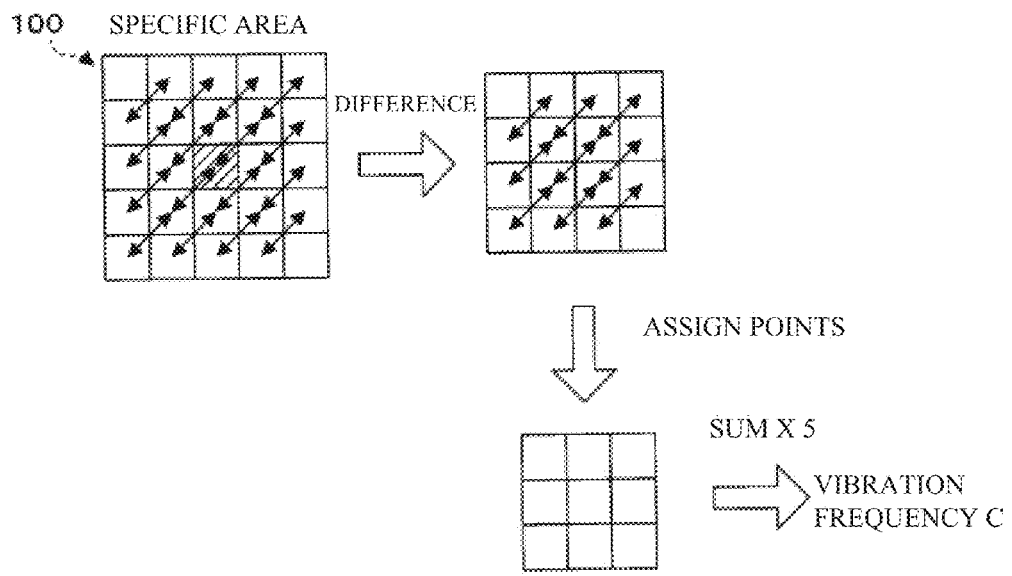
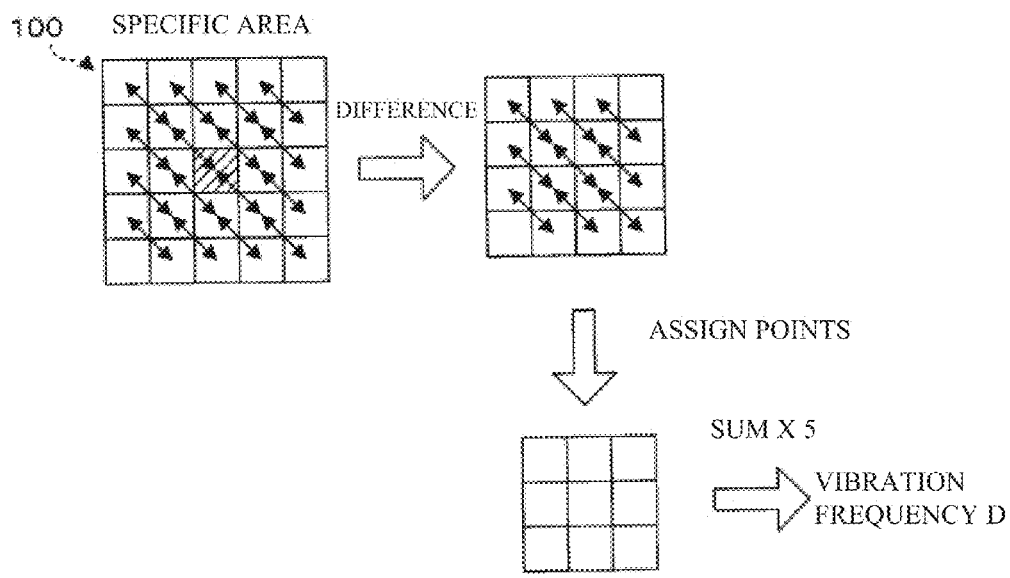

IMAGE PROCESSING DEVICE, IMAGE PROCESSING METHOD, AND COMPUTER PROGRAM

TECHNICAL FIELD

The present invention relates to an image processing device, image processing method, and computer program which can accurately detect noise in an input image and eliminate or reduce the noise.

BACKGROUND ART

Noise in which the pixel value varies stepwise among adjacent pixels, such as block noise, has been known as noise in an image. Block noise occurs when an image is compressed using a scheme such as Moving Picture Expert Group (MPEG) or Joint Photographic Experts Group (JPEG). An image compression scheme such as MPEG or JPEG involves dividing the original image into blocks having a specific size and then compressing the image on a block basis. This process makes the pixel value discontinuous across the boundaries of the adjacent blocks, so that the user may visually recognize the block boundaries as noise. Such block noise can occur when compressing an image, as well as when dividing an image into blocks having a specific size and then processing the image.

Patent Literature 1 proposes a block noise detection device which calculates the spatial differences between the adjacent pixels with respect to an input video signal, outputs a spatial difference comparison determination signal on the basis of a comparison among the adjacent multiple spatial differences, counts the spatial difference comparison determination signals for each phase, outputs accumulation signals, makes a comparison among the values of the multiple accumulation signals, and outputs a phase corresponding to an accumulation signal having the largest value as a maximum accumulation time phase signal.

CITATION LIST

Patent Literature

Patent Literature 1: Japanese Unexamined Patent Application Publication No. 2009-105990

SUMMARY OF INVENTION

Technical Problem

However, the block noise detection device of Patent Literature 1 has a problem that block noise can be detected only when the block size is fixed. Accordingly, this device cannot handle an image generated through image processing in which the block size is variable. Another problem with the block noise detection device of Patent Literature 1 is that the boundary of the detected block noise has a width corresponding to one pixel and, when smoothing pixels around a pixel corresponding to the noise boundary, one of the areas horizontally (or vertically) adjacent to the noise boundary is smoothed as an area larger than the other area by one pixel. Further, the block noise detection device of Patent Literature 1 is configured to always smooth the detected pixels. Accordingly, this device smoothes even pixels which actually need not be smoothed, so that image quality may degrade.

Further, in a traditional noise elimination process, the same smoothing filter is used, regardless of the type of detected noise (e.g., noise including only a low-frequency component, noise including a low-frequency component, as well as a high-frequency component, and the like). For this reason, if an image includes multiple types of noise, there may be obtained a noise elimination result where one type of noise has been eliminated with high performance and the other type of noise has been eliminated with low performance.

The present invention has been made in view of the foregoing, and an object thereof is to provide an image processing device, image processing method, and computer program which can accurately detect noise in an input image and eliminate or reduce the noise. Another object of the present invention is to provide an image processing device, image processing method, and computer program which, even when an input image includes multiple types of noise, can properly smooth the input image to eliminate or reduce the noise.

Solution to Problem

The present invention provides an image processing device for eliminating or reducing noise from an input image comprising a plurality of pixels arranged in a matrix to generate an output image. The image processing device comprises:
specific area extraction means configured to extract a specific area comprising a target pixel from the input image;
smoothing determination means configured to determine whether to perform a first smoothing process on the target pixel, on the basis of the specific area extracted by the specific area extraction means;
first smoothing means configured to, if the smoothing determination means determines that the first smoothing process is to be performed on the target pixel, perform the first smoothing process using a smoothing filter to smooth a value of the target pixel; and
second smoothing means configured to, if the smoothing determination means determines that the first smoothing process is not to be performed on the target pixel, perform a second smoothing process using an edge-preserving smoothing filter to smooth the value of the target pixel. The image processing device generates an output image by replacing a value of each pixel in the input image with either a pixel value smoothed by the first smoothing means or a pixel value smoothed by the second smoothing means.

The image processing device of the present invention further comprises:
noise boundary direction determination means configured to, if the smoothing determination means determines that the first smoothing process is to be performed on the target pixel, determine an extending direction of a boundary of noise in the specific area; and
noise boundary position determination means configured to, if the smoothing determination means determines that the first smoothing process is to be performed on the target pixel, determine a position of the noise boundary in the specific area.

In the image processing device of the present invention, if the smoothing determination means determines that the smoothing process is to be performed on the target pixel and if the direction determined by the noise boundary direction determination means is a predetermined direction, the noise boundary position determination means determines the position of the noise boundary in the specific area.

The image processing device of the present invention further comprises specific area expansion means configured to, if the direction determined by the noise boundary direction determination means is not the predetermined direction, expand the specific area. The noise boundary direction determination means re-determines the direction in the specific area expanded by the specific area expansion means.

In the image processing device of the present invention, expansion of the specific area by the specific area expansion means and determination of the direction by the noise boundary direction determination means are repeated until the direction determined by the noise boundary direction determination means becomes the predetermined direction or until a size of the specific area becomes a predetermined size.

The image processing device of the present invention further comprises:

smoothing filter storage means configured to store a plurality of smoothing filters used by the first smoothing means; and filter selection means configured to select a smoothing filter from the smoothing filters stored in the smoothing filter storage means on the basis of the position determined by the noise boundary position determination means and the direction determined by the noise boundary direction determination means. The first smoothing means smoothes the value of the target pixel using the smoothing filter selected by the filter selection means.

The image processing device of the present invention further comprises differential calculation means configured to calculate differentials between values of pixels in an image of the specific area extracted by the specific area extraction means. The smoothing determination means determines whether the smoothing process is to be performed on the target pixel, on the basis of the differentials calculated by the differential calculation means.

In the image processing device of the present invention, the differential calculation means calculates first- and second-order differentials between values of adjacent pixels, and the smoothing determination means makes a determination on the basis of the first- and second-order differentials calculated by the differential calculation means.

The image processing device of the present invention further comprises:

first-order differential binarization means configured to binarize the first-order differentials calculated by the differential calculation means on the basis of whether the first-order differentials each exceed a threshold;

first OR operation means configured to perform an OR operation on the first-order differentials binarized by the first-order differential binarization means;

second-order differential binarization means configured to binarize the second-order differentials calculated by the differential calculation means on the basis of whether the second-order differentials each exceed a threshold;

second OR operation means configured to perform an OR operation on the second-order differentials binarized by the second-order differential binarization means; and third OR operation means configured to perform an OR operation on a result of the operation performed by the first OR operation means and a result of the operation performed by the second OR operation means. The smoothing determination means makes a determination on the basis of a result of the operation performed by the third OR operation means.

In the image processing device of the present invention, the differential calculation means, the first-order differential binarization means, the first OR operation means, the second-order differential binarization means, the second OR operation means, and the third OR operation means perform respective processes with respect to longitudinal and transverse directions of the specific area, and the smoothing determination means makes a determination on the basis of results of the operations performed with respect to the longitudinal and transverse directions by the third OR operation means.

The image processing device of the present invention further comprises noise boundary direction determination means configured to, if the smoothing determination means determines that the first smoothing process is to be performed on the target pixel, determine an extending direction of a boundary of noise in the specific area. The noise boundary direction determination means determines whether the noise boundary extends in the longitudinal direction and/or the transverse direction in the specific area, on the basis of the results of the operations with respect to the longitudinal and transverse directions performed by the third OR operation means.

The image processing device of the present invention further comprises noise boundary position determination means configured to, if the smoothing determination means determines that the first smoothing process is to be performed on the target pixel, determine a position of a boundary of noise in the specific area. The noise boundary position determination means determines the position of the noise boundary in the specific area on the basis of a pattern in the specific area, of the second-order differentials binarized by the second-order differential binarization means.

The image processing device of the present invention further comprises:

Sobel filter storage means configured to store a plurality of Sobel filters which detect strengths of edge components in different specific directions;

edge strength calculation means configured to filter the specific area extracted by the specific area extraction means using the Sobel filters stored in the Sobel filter storage means and to calculate strengths of edge components in a plurality of directions in the specific area; and edge strength difference determination means configured to determine whether a difference between the highest and lowest of the plurality of edge strengths calculated by the edge strength calculation means exceeds a threshold. If the edge strength difference determination means determines that the difference does not exceed the threshold, the second smoothing means smoothes the value of the target pixel in the specific area using a smoothing filter which is not of an edge-preserving type.

The image processing device of the present invention further comprises application determination means configured to determine whether to apply a result of the smoothing process performed by the second smoothing means. The image processing device generates an output image by replacing a value of each pixel in the input image with one of a pixel value smoothed by the first smoothing means, a pixel value smoothed by the second smoothing means, and a yet-to-be-smoothed, original pixel value.

The image processing device of the present invention further comprises:

second edge strength calculation means configured to filter the specific area extracted by the specific area extraction means using a Laplacian filter and to calculate a strength of an edge component in the specific area; and edge strength determination means configured to determine whether the strength calculated by the second edge strength calculation means exceeds a threshold.

If the edge strength determination means determines that the strength exceeds the threshold, the application determination means determines that the result of the smoothing process performed by the second smoothing means is to be applied, and if the edge strength determination means determines that the strength does not exceed the threshold, the application determination means determines that the result of the smoothing process performed by the second smoothing means is not to be applied.

The image processing device of the present invention further comprises:

increase/decrease frequency calculation means configured to calculate an increase/decrease frequency of values of adjacent pixels in a specific direction in the specific area extracted by the specific area extraction means; and increase/decrease frequency determination means configured to determine whether the increase/decrease frequency calculated by the increase/decrease frequency calculation means exceeds a threshold.

If the increase/decrease frequency determination means determines that the increase/decrease frequency does not exceed the threshold, the application determination means determines that the result of the smoothing process performed by the second smoothing means is to be applied, and if the increase/decrease frequency determination means determines that the increase/decrease frequency exceeds the threshold, the application determination means determines that the result of the smoothing process performed by the second smoothing means is not to be applied.

The image processing device of the present invention further comprises:

smoothing difference calculation means configured to calculate a difference between the value of the target pixel in the specific area extracted by the specific area extraction means and the pixel value smoothed by the second smoothing means; and smoothing difference determination means configured to determine whether the difference calculated by the smoothing difference calculation means exceeds a threshold.

If the smoothing difference determination means determines that the difference does not exceed the threshold, the application determination means determines that the result of the smoothing process performed by the second smoothing means is to be applied, and if the smoothing difference determination means determines that the difference exceeds the threshold, the application determination means determines that the result of the smoothing process performed by the second smoothing means is not to be applied.

The present invention provides an image processing device for eliminating or reducing noise from an input image comprising a plurality of pixels arranged in a matrix to generate an output image. The image processing device comprises:

specific area extraction means configured to extract a specific area comprising a target pixel from the input image;

smoothing determination means configured to determine whether to perform a first smoothing process on the target pixel, on the basis of the specific area extracted by the specific area extraction means;

first smoothing means configured to, if the smoothing determination means determines that the first smoothing process is to be performed on the target pixel, perform the first smoothing process using a smoothing filter to smooth a value of the target pixel;

second smoothing means configured to, if the smoothing determination means determines that the first smoothing process is not to be performed on the target pixel, perform a second smoothing process using an edge-preserving smoothing filter to smooth the value of the target pixel; and application determination means configured to determine whether to apply a result of the smoothing process performed by the second smoothing means.

The image processing device generates an output image by replacing a value of each pixel in the input image with one of a pixel value smoothed by the first smoothing means, a pixel value smoothed by the second smoothing means, and a yet-to-be-smoothed, original pixel value.

The present invention provides an image processing device for eliminating or reducing noise from an input image comprising a plurality of pixels arranged in a matrix to generate an output image. The image processing device comprises:

specific area extraction means configured to extract a specific area comprising a target pixel from the input image;

differential calculation means configured to calculate differentials between values of pixels in an image of the specific area extracted by the specific area extraction means;

smoothing determination means configured to determine whether to perform a smoothing process on the target pixel, on the basis of the differentials calculated by the differential calculation means;

noise boundary direction determination means configured to, if the smoothing determination means determines that the smoothing process is to be performed on the target pixel, determine an extending direction of a boundary of noise in the specific area;

noise boundary position determination means configured to, if the smoothing determination means determines that the smoothing process is to be performed on the target pixel, determine a position of the noise boundary in the specific area; and smoothing means configured to, if the smoothing determination means determines that the smoothing process is to be performed on the target pixel, perform the smoothing process on the target pixel on the basis of the direction determined by the noise boundary direction determination means and the position determined by the noise boundary position determination means.

The present invention provides an image processing device comprising:

specific area extraction means configured to extract a specific area comprising a target pixel from an input image comprising a plurality of pixels arranged in a matrix;

differential calculation means configured to calculate differentials between values of pixels in an image of the specific area extracted by the specific area extraction means;

noise boundary direction determination means configured to determine an extending direction of a boundary of noise in the specific area on the basis of the differentials calculated by the differential calculation means; and noise boundary position determination means configured to determine a position of the noise boundary in the specific area on the basis of the differentials calculated by the differential calculation means.

The present invention provides an image processing method for eliminating or reducing noise from an input image comprising a plurality of pixels arranged in a matrix to generate an output image. The image processing method comprises:

a specific area extraction step of extracting a specific area comprising a target pixel from the input image;

a smoothing determination step of determining whether to perform a first smoothing process on the target pixel, on the basis of the specific area extracted in specific area extraction step;

a first smoothing step of, if it is determined in the smoothing determination step that the first smoothing process is to be performed on the target pixel, performing the first smoothing process using a smoothing filter to smooth a value of the target pixel;

a second smoothing step of, if it is determined in the smoothing determination step that the first smoothing process is not to be performed on the target pixel, performing a second smoothing process using an edge-preserving smoothing filter to smooth the value of the target pixel; and a generation step of generating an output image by replacing a value of each pixel in the input image with either a pixel value smoothed in the first smoothing step or a pixel value smoothed in the second smoothing step.

The image processing method of the present invention further comprises:

a noise boundary direction determination step of, if it is determined in the smoothing determination step that the first smoothing process is to be performed on the target pixel, determining an extending direction of a boundary of noise in the specific area; and a noise boundary position determination step of, if it is determined in the smoothing determination step that the first smoothing process is to be performed on the target pixel, determining a position of the noise boundary in the specific area.

In the image processing method of the present invention, the noise boundary position determination step comprises, if it is determined in the smoothing determination step that the smoothing process is to be performed on the target pixel and if the direction determined in the noise boundary direction determination step is a predetermined direction, determining the position of the noise boundary in the specific area.

The image processing method of the present invention further comprises a specific area expansion step of, if the direction determined in the noise boundary direction determination step is not the predetermined direction, expanding the specific area.

The noise boundary direction determination step comprises re-determining the direction in the specific area expanded in the specific area expansion step.

In the image processing method of the present invention, expansion of the specific area in the specific area expansion step and determination of the direction in the noise boundary direction determination step are repeated until the direction determined in the noise boundary direction determination step becomes the predetermined direction or until a size of the specific area extraction becomes a predetermined size in the specific area expansion step.

In the image processing method of the present invention, a plurality of smoothing filters used in the first smoothing step are previously stored, the method further comprises a filter selection step of selecting a smoothing filter from the stored smoothing filters on the basis of the position determined in the noise boundary position determination step and the direction determined in the noise boundary direction determination step.

The first smoothing step comprises smoothing the value of the target pixel using the smoothing filter selected in the filter selection step.

The image processing method of the present invention further comprises a differential calculation step of calculating differentials between values of pixels in an image of the specific area extracted in the specific area extraction step.

The smoothing determination step comprises determining whether the smoothing process is to be performed on the target pixel, on the basis of the differentials calculated in the differential calculation step.

In the image processing method of the present invention, the differential calculation step comprises calculating first- and second-order differentials between values of adjacent pixels, and the smoothing determination step comprises making a determination on the basis of the first- and second-order differentials calculated in the differential calculation step.

The image processing method of the present invention further comprises:

a first-order differential binarization step of binarizing the first-order differentials calculated in the differential calculation step on the basis of whether the first-order differentials each exceed a threshold;

a first OR operation step of performing an OR operation on the first-order differentials binarized in the first-order differential binarization step;

a second-order differential binarization step of binarizing the second-order differentials calculated in the differential calculation step on the basis of whether the second-order differentials each exceed a threshold;

a second OR operation step of performing an OR operation on the second-order differentials binarized in the second-order differential binarization step; and a third OR operation step of performing an OR operation on a result of the operation in the first OR operation step and a result of the operation in the second OR operation step.

The smoothing determination step comprises making a determination on the basis of a result of the operation in the third OR operation step.

In the image processing method of the present invention, the differential calculation step, the first-order differential binarization step, the first OR operation step, the second-order differential binarization step, the second OR operation step, and the third OR operation step each comprise performing processes with respect to longitudinal and transverse directions of the specific area, and the smoothing determination step comprises making a determination on the basis of results of the operations with respect to the longitudinal and transverse directions in the third OR operation step.

The image processing method of the present invention further comprises a noise boundary direction determination step of, if it is determined in the smoothing determination step that the first smoothing process is to be performed on the target pixel, determining an extending direction of a boundary of noise in the specific area.

The noise boundary direction determination step comprises determining whether the noise boundary extends in the longitudinal direction and/or the transverse direction in the specific area, on the basis of the results of the operations with respect to the longitudinal and transverse directions in the third OR operation step.

The image processing method of the present invention further comprises a noise boundary position determination step of, if it is determined in the smoothing determination step that the first smoothing process is to be performed on the target pixel, determining a position of the noise boundary in the specific area. The noise boundary position determination step comprises determining the position of the noise boundary in the specific area on the basis of a pattern in the specific area, of the second-order differentials binarized in the second-order differential binarization step.

The image processing method of the present invention further comprises:

an edge strength calculation step of previously storing a plurality of Sobel filters which detect strengths of edge components in different specific directions, filtering the specific area extracted in the specific area extraction step using the stored Sobel filters, and calculating strengths of edge components in a plurality of directions in the specific area; and an edge strength difference determination step of determining whether a difference between the highest and lowest of the plurality of edge strengths calculated in the edge strength calculation step exceeds a threshold.

The second smoothing step comprises, if it is determined in the edge strength difference determination step that the difference does not exceed the threshold, smoothing the value of the target pixel in the specific area using a smoothing filter which is not of an edge-preserving type.

The image processing method of the present invention further comprises an application determination step of determining whether to apply a result of the smoothing process performed in the second smoothing step.

The generation step comprises generating an output image by replacing a value of each pixel in the input image with one of a pixel value smoothed in the first smoothing step, a pixel value smoothed in the second smoothing step, and a yet-to-be-smoothed, original pixel value.

The image processing method of the present invention further comprises:

a second edge strength calculation step of filtering the specific area extracted in the specific area extraction step using a Laplacian filter and calculating a strength of an edge component in the specific area; and an edge strength determination step of determining whether the strength calculated in the second edge strength calculation step exceeds a threshold.

The application determination step comprises, if it is determined in the edge strength determination step that the strength exceeds the threshold, determining that the result of the smoothing process performed in the second smoothing step is to be applied and, if it is determined in the edge strength determination step that the strength does not exceed the threshold, determining that the result of the smoothing process performed in the second smoothing step is not to be applied.

The image processing method of the present invention further comprises:

an increase/decrease frequency calculation step of calculating an increase/decrease frequency of values of adjacent pixels in a specific direction in the specific area extracted in the specific area extraction step; and an increase/decrease frequency determination step of determining whether the increase/decrease frequency calculated in the increase/decrease frequency calculation step exceeds a threshold.

The application determination step comprises, if it is determined in the increase/decrease frequency determination step that the increase/decrease frequency does not exceed the threshold, determining that the result of the smoothing process performed in the second smoothing step is to be applied and, if it is determined in the increase/decrease frequency determination step that the increase/decrease frequency exceeds the threshold, determining that the result of the smoothing process performed in the second smoothing step is not to be applied.

The image processing method of the present invention further comprises:

a smoothing difference calculation step of calculating a difference between the value of the target pixel in the specific area extracted in the specific area extraction step and the pixel value smoothed in the second smoothing step; and a smoothing difference determination step of determining whether the difference calculated in the smoothing difference calculation step exceeds a threshold.

The application determination step comprises, if it is determined in the smoothing difference determination step that the difference does not exceed the threshold, determining that the result of the smoothing process performed in the second smoothing step is to be applied and, if it is determined in the smoothing difference determination step that the difference exceeds the threshold, determining that the result of the smoothing process performed in the second smoothing step is not to be applied.

The present invention provides an image processing method for eliminating or reducing noise from an input image comprising a plurality of pixels arranged in a matrix to generate an output image. The image processing method comprises:

a specific area extraction step of extracting a specific area comprising a target pixel from the input image;

a smoothing determination step of determining whether to perform a first smoothing process on the target pixel, on the basis of the specific area extracted in specific area extraction step;

a first smoothing step of, if it is determined in the smoothing determination step that the first smoothing process is to be performed on the target pixel, performing the first smoothing process using a smoothing filter to smooth a value of the target pixel;

a second smoothing step of, if it is determined in the smoothing determination step that the first smoothing process is not to be performed on the target pixel, performing a second smoothing process using an edge-preserving smoothing filter to smooth the value of the target pixel;

an application determination step of determining whether to apply a result of the smoothing process performed in the second smoothing step; and a generation step of generating an output image by replacing a value of each pixel in the input image with one of a pixel value smoothed in the first smoothing step, a pixel value smoothed in the second smoothing step, and a yet-to-be-smoothed, original pixel value.

The present invention provides an image processing method for eliminating or reducing noise from an input image comprising a plurality of pixels arranged in a matrix to generate an output image. The image processing method comprises:

a specific area extraction step of extracting a specific area comprising a target pixel from the input image;

a differential calculation step of calculating differentials between values of pixels in an image of the specific area extracted in the specific area extraction step;

a smoothing determination step of determining whether to perform a smoothing process on the target pixel, on the basis of the differentials calculated in the differential calculation step;

a noise boundary direction determination step of, if it is determined in the smoothing determination step that the smoothing process is to be performed on the target pixel, determining an extending direction of a boundary of noise in the specific area;

a noise boundary position determination step of, if it is determined in the smoothing determination step that the smoothing process is to be performed on the target pixel, determining a position of the noise boundary in the specific area; and a smoothing step of, if it is determined in the smoothing determination step that the smoothing process is to be performed on the target pixel, performing the smoothing process on the target pixel on the basis of the direction determined in the noise boundary direction determination step and the position determined in the noise boundary position determination step.

The present invention provides an image processing method comprising:

a specific area extraction step of extracting a specific area comprising a target pixel from an input image comprising a plurality of pixels arranged in a matrix;

a differential calculation step of calculating differentials between values of pixels in an image of the specific area extracted in the specific area extraction step;

a noise boundary direction determination step of determining an extending direction of a boundary of noise in the specific area on the basis of the differentials calculated in the differential calculation step; and a noise boundary position determination step of determining a position of the noise boundary in the specific area on the basis of the differentials calculated in the differential calculation step.

The present invention provides a computer program for eliminating or reducing noise from an input image comprising a plurality of pixels arranged in a matrix to generate an output image. The computer program causes the computer to operate as:

specific area extraction means configured to extract a specific area comprising a target pixel from the input image;

smoothing determination means configured to determine whether to perform a first smoothing process on the target pixel, on the basis of the specific area extracted by the specific area extraction means;

first smoothing means configured to, if the smoothing determination means determines that the first smoothing process is to be performed on the target pixel, perform the first smoothing process using a smoothing filter to smooth a value of the target pixel;

second smoothing means configured to, if the smoothing determination means determines that the first smoothing process is not to be performed on the target pixel, perform a second smoothing process using an edge-preserving smoothing filter to smooth the value of the target pixel; and generation means configured to generate an output image by replacing a value of each pixel in the input image with either a pixel value smoothed by the first smoothing means or a pixel value smoothed by the second smoothing means.

The present invention provides a computer program for eliminating or reducing noise from an input image comprising a plurality of pixels arranged in a matrix to generate an output image. The computer program causes the computer to operate as:

specific area extraction means configured to extract a specific area comprising a target pixel from the input image;

smoothing determination means configured to determine whether to perform a first smoothing process on the target pixel, on the basis of the specific area extracted by the specific area extraction means;

first smoothing means configured to, if the smoothing determination means determines that the first smoothing process is to be performed on the target pixel, perform the first smoothing process using a smoothing filter to smooth a value of the target pixel;

second smoothing means configured to, if the smoothing determination means determines that the first smoothing process is not to be performed on the target pixel, perform a second smoothing process using an edge-preserving smoothing filter to smooth the value of the target pixel;

application determination means configured to determine whether to apply a result of the smoothing process performed by the second smoothing means; and generation means configured to generate an output image by replacing a value of each pixel in the input image with one of a pixel value smoothed by the first smoothing means, a pixel value smoothed by the second smoothing means, and a yet-to-be-smoothed, original pixel value.

The present invention provides a computer program for eliminating or reducing noise from an input image comprising a plurality of pixels arranged in a matrix to generate an output image. The computer program causes the computer to operate as:

specific area extraction means configured to extract a specific area comprising a target pixel from the input image;

differential calculation means configured to calculate differentials between values of pixels in an image of the specific area extracted by the specific area extraction means;

smoothing determination means configured to determine whether to perform a smoothing process on the target pixel, on the basis of the differentials calculated by the differential calculation means;

noise boundary direction determination means configured to, if the smoothing determination means determines that the smoothing process is to be performed on the target pixel, determine an extending direction of a boundary of noise in the specific area;

noise boundary position determination means configured to, if the smoothing determination means determines that the smoothing process is to be performed on the target pixel, determine a position of the noise boundary in the specific area; and smoothing means configured to, if the smoothing determination means determines that the smoothing process is to be performed on the target pixel, perform the smoothing process on the target pixel on the basis of the direction determined by the noise boundary direction determination means and the position determined by the noise boundary position determination means.

The present invention provides a computer program for causing a computer to operate as:

specific area extraction means configured to extract a specific area comprising a target pixel from an input image comprising a plurality of pixels arranged in a matrix;

differential calculation means configured to calculate differentials between values of pixels in an image of the specific area extracted by the specific area extraction means;

noise boundary direction determination means configured to determine an extending direction of a boundary of noise in the specific area on the basis of the differentials calculated by the differential calculation means; and noise boundary position determination means configured to determine a position of the noise boundary in the specific area on the basis of the differentials calculated by the differential calculation means.

The present invention involves extracting a specific area including a target pixel from an input image, calculating the differentials between the values of pixels adjacent to the target pixel, determining whether to smooth the target pixel in the specific area, on the basis of the calculated differentials, and, if it is determined that the target pixel is to be smoothed, determining the extending direction and position of the boundary of noise.

Thus, it is possible to properly filter the specific area on the basis of the direction and position of the noise boundary to accurately eliminate or reduce the noise in the input image.

The present invention also involves, if the extending direction of the noise boundary in the specific area is not the predetermined direction, expanding the specific area to re-determine the direction of the noise boundary. This process may be repeated until the direction of the noise boundary becomes the predetermined direction or until the size of the specific area becomes the predetermined size. Thus, block noises having various sizes can be accurately detected.

The present invention also involves calculating the first- and second-order differentials between the values of the adjacent pixels to determine whether to smooth the target pixel in the specific area. The above process may include comparing the first-order differentials with the threshold to binarize the first-order differentials, performing an OR operation on the binarized first-order differentials, comparing the second-order differentials with the threshold to binarize the second-order differentials, performing an OR operation on the binarized second-order differentials, performing an OR operation on the result of the OR operation on the binarized first-order differentials and the result of the OR operation on the binarized second-order differentials, and making a determination on the basis of the operation result. The above process may also be performing these calculations with respect to the longitudinal and transverse directions (vertical and horizontal directions) of the image and then determining whether to perform the smoothing process, on the basis of the operation results with respect to the respective directions.

Thus, the noise in the specific area can be accurately detected.

The present invention also involves determining whether the noise boundary extends in the longitudinal and/or transverse directions, on the basis of the ORs with respect to the longitudinal and transverse directions obtained through the above operations. Thus, whether the noise boundary extends in the longitudinal and/or transverse directions can be easily determined.

The present invention also involves determining the position of the noise boundary in the specific area, on the basis of the 0/1 array pattern of the binarized second-order differentials in the specific area. Thus, the position of the noise boundary can be easily determined.

The present invention also involves previously storing multiple smoothing filters for eliminating or reducing noise, selecting a smoothing filter from the stored smoothing filters on the basis of the direction and position of the noise boundary in the specific area, and smoothing the value of the target pixel in the specific area using the selected smoothing filter. Thus, the target pixel can be smoothed in a manner suitable for the position and direction of the noise boundary in the specific area.

The present invention also involves determining whether to perform the first smoothing process on the target pixel on the basis of the specific area extracted from the input image, if so determined, performing the first smoothing process on the target pixel using a smoothing filter, and if not so determined, performing a second smoothing process on the target pixel using an edge-preserving smoothing filter. At this time, whether to apply the result of the second smoothing process is determined based on the pixel values in the specific area, the result of the second smoothing process, and the like.

The image processing unit selects a pixel value smoothed in the first smoothing process, a pixel value smoothed in the second smoothing process, or the yet-to-be-smoothed, original pixel value in the input image, as the value of a pixel in an output image corresponding to the target pixel in the input image. By making such selection with respect to all the pixels in the input image, an output image can be generated.

Thus, it is possible to smooth each pixel in the input image in a manner suitable for the pixel, as well as to generate an output image without smoothing pixels which need not be smoothed.

The present invention also involves calculating the strengths of edge components in multiple directions in the specific area using multiple Sobel filters, selecting the highest and lowest of the calculated multiple edge strengths, and determining whether the difference therebetween exceeds the threshold. If the difference does not exceed the threshold, the specific area can be regarded as an approximately flat image including no edge component and therefore can be smoothed using a smoothing filter which is not of edge-preserving type.

The present invention also involves determining whether to apply the result of the smoothing process using the edge-preserving smoothing filter, on the basis of one or more criteria.

For example, if an input image including a clear edge or pattern, or the like is smoothed, the image quality may be degraded. In such a case, the original pixel value is used rather than the result of the smoothing process.

The present invention also involves filtering the extracted specific area using a Laplacian filter, calculating the strength of the edge component in the specific area, determining whether the calculated strength exceeds the threshold, using the result of the smoothing process if the strength of the edge component exceeds the threshold, and not using the result of the smoothing process if the strength does not exceed the threshold.

For example, if an input image includes fine texture such as pixel-based texture, the edge strength may be determined to be a lower strength, depending on the arrangement or the like. Or, even when an edge-preserving smoothing filter is used, such an image may be smoothed without the edge thereof being preserved, or the texture may become ambiguous. For this reason, the vibration frequency of the pixels (the increase/decrease frequency of the pixel values) in the specific area is calculated. If the calculated vibration frequency is higher than the threshold, this specific area is regarded as a texture area, and the result of the smoothing process is not used. Thus, degradation of the texture due to the smoothing process can be prevented.

For example, if only the target pixel has a significantly different value from those of the other pixels in the specific area, whether such a value is derived from texture or noise is difficult to determine. In such a case, the difference between the values of the target pixel before and after the smoothing process is calculated to reduce the effect of the smoothing process. If the calculated difference exceeds the threshold, the result of the smoothing process is not used. Thus, the effect of the smoothing process can be controlled within the threshold.

Advantageous Effects of Invention

According to the present invention, it is possible to accurately detect noise in an input image, as well as to smooth the input image in a manner suitable for the position and direction of the noise boundary. Thus, the noise in the input image can be accurately eliminated or reduced. Further, if the direction of the noise boundary in the specific area is not the predetermined direction, the specific area is expanded to re-determine the direction of the noise boundary. Thus, block noises having various sizes can be accurately detected.

Further, according to the present invention, a pixel value smoothed using the smoothing filter, a pixel value smoothed using the edge-preserving smoothing filter, or the yet-to-be-smoothed, original pixel value is selected as the value of a pixel in an output image corresponding to the target pixel and then outputted. Thus, it is possible to smooth the respective pixels in the input image in a manner suitable for the type of noise or the like and to generate a high-quality output image where the noise is eliminated or reduced.

BRIEF DESCRIPTION OF THE DRAWINGS

FIG. 8 is a schematic diagram showing a noise boundary direction determination process.

FIG. 10 includes schematic diagrams each showing an example of a smoothing filter.

FIG. 11 includes schematic diagrams each showing an example of a smoothing filter.

FIG. 12 includes schematic diagrams each showing an example of an edge-preserving smoothing filter.

FIG. 13 includes schematic diagrams each showing an example of an edge-preserving smoothing filter.

FIG. 14 is a schematic diagram showing an example of an edge-preserving smoothing filter.

FIG. 15 includes schematic diagrams each showing an example of a Sobel filter for determining the direction.

FIG. 21 includes schematic diagrams showing an application determination based on the vibration frequency.

FIG. 22 includes schematic diagrams showing an application determination based on the vibration frequency.

DESCRIPTION OF EMBODIMENTS

Figure 1:
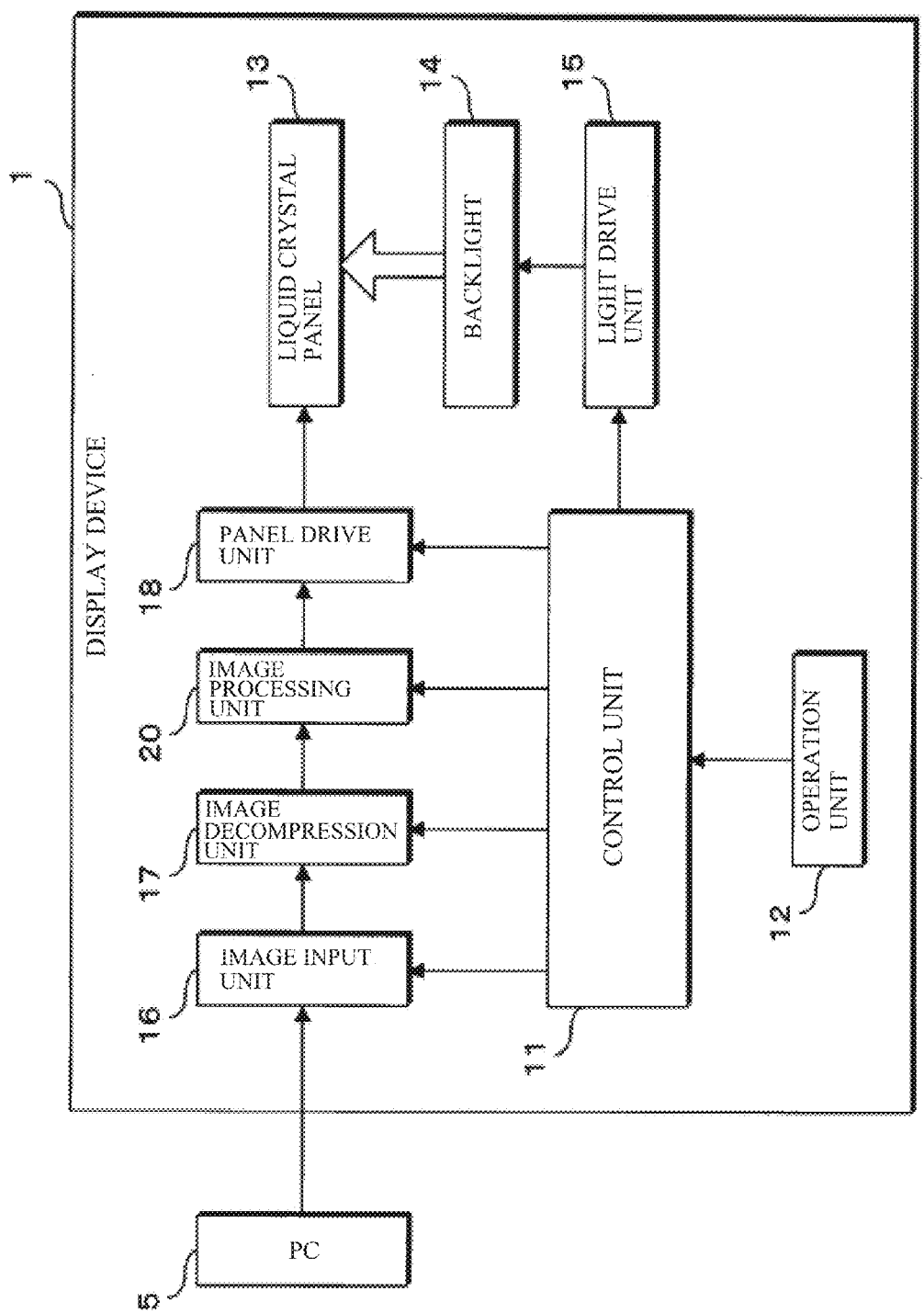
FIG. 1 is a block diagram showing the configuration of a display device of the present embodiment.

Now, an embodiment of the present invention will be described specifically with reference to the drawings. To describe the configuration of an image processing device, image processing method, and computer program of the present embodiment, there will be described, as an example, a display device which performs image processing such as noise elimination or reduction on an input image from an external device such as a personal computer (PC) and then displays the resulting image on a display unit such as a liquid crystal panel. FIG. 1 is a block diagram showing the configuration of a display device of the present embodiment. As shown in FIG. 1, a display device 1 performs various types of image processing on still images or moving images received from an external device such as a PC 5 and then displays the resulting images on a liquid crystal panel 13.

The display device 1 includes an image input unit 16, an image decompression unit 17, an image processing unit 20, a panel drive unit 18, and the like for driving a liquid crystal panel 13 on the basis of input images from the PC 5. The display device 1 also includes a backlight 14 that applies light to the back side of the liquid crystal panel 13 in order to display images and a light drive unit 15 that drives the backlight 14. The display device 1 also includes an operation unit 12 that receives an operation of the user and a control unit 11 that controls the operations of the elements in the device on the basis of the received operation.

The control unit 11 includes an arithmetic processor such as a central processing unit (CPU) or micro processing unit (MPU). The operation unit 12 includes one or more switches disposed at the front edge, side surface, or the like of the cabinet of the display device 1. It receives an operation of the user through these switches and notifies the control unit 11 of the received operation. For example, the user can change the brightness setting or color balance setting related to image display through the operation unit 12. At this time, the control unit 11 controls the operations of the elements in the device on the basis of the setting change received through the operation unit 12.

The image input unit 16 has a connection terminal to which an external device such as the PC 5 is connected through a video signal cable. In the present embodiment, the display device 1 receives, from the PC 5, image data compressed using a compression scheme such as MPEG or JPEG, serving as an input image. The image input unit 16 provides the input image from the PC 5 to the image decompression unit 17. The image decompression unit 17 decompresses the input image from the image input unit 16 using a method corresponding to the compression scheme and then provides the resulting input image to the image processing unit 20.

The image processing unit 20 can perform various types of image processing on the input image provided by the image decompression unit 17. In the present embodiment, the image processing unit 20 can perform image processing such that stepwise noise, such as block noise, in the input image is eliminated (or reduced). The noise elimination process performed by the image processing unit 20 will be described in detail later. The image processing unit 20 provides the resulting image to the panel drive unit 18.

The panel drive unit 18 generates drive signals for driving the pixels included in the liquid crystal panel 13 on the basis of the input image provided by the image processing unit 20 and then outputs the drive signals. The liquid crystal panel 13 is a display device in which multiple pixels are arranged in a matrix and which displays images by changing the transmittance of the respective pixels on the basis of the drive signals from the panel drive unit 18.

The backlight 14 includes a light source such as a light-emitting diode (LED) or cold cathode fluorescent lamp (CCFL). It generates light on the basis of a drive voltage or drive current provided by the light drive unit 15 and applies the light to the back side of the liquid crystal panel 13. The light drive unit 15 generates a drive voltage or drive current on the basis of a control signal from the control unit 11 and then outputs it to the backlight 14. The control unit 11 determines the amount of drive of the backlight 14, for example, on the basis of the brightness setting or the like received through the operation unit 12 and outputs a control signal corresponding to the determined amount of drive to the light drive unit 15.

Figure 2:
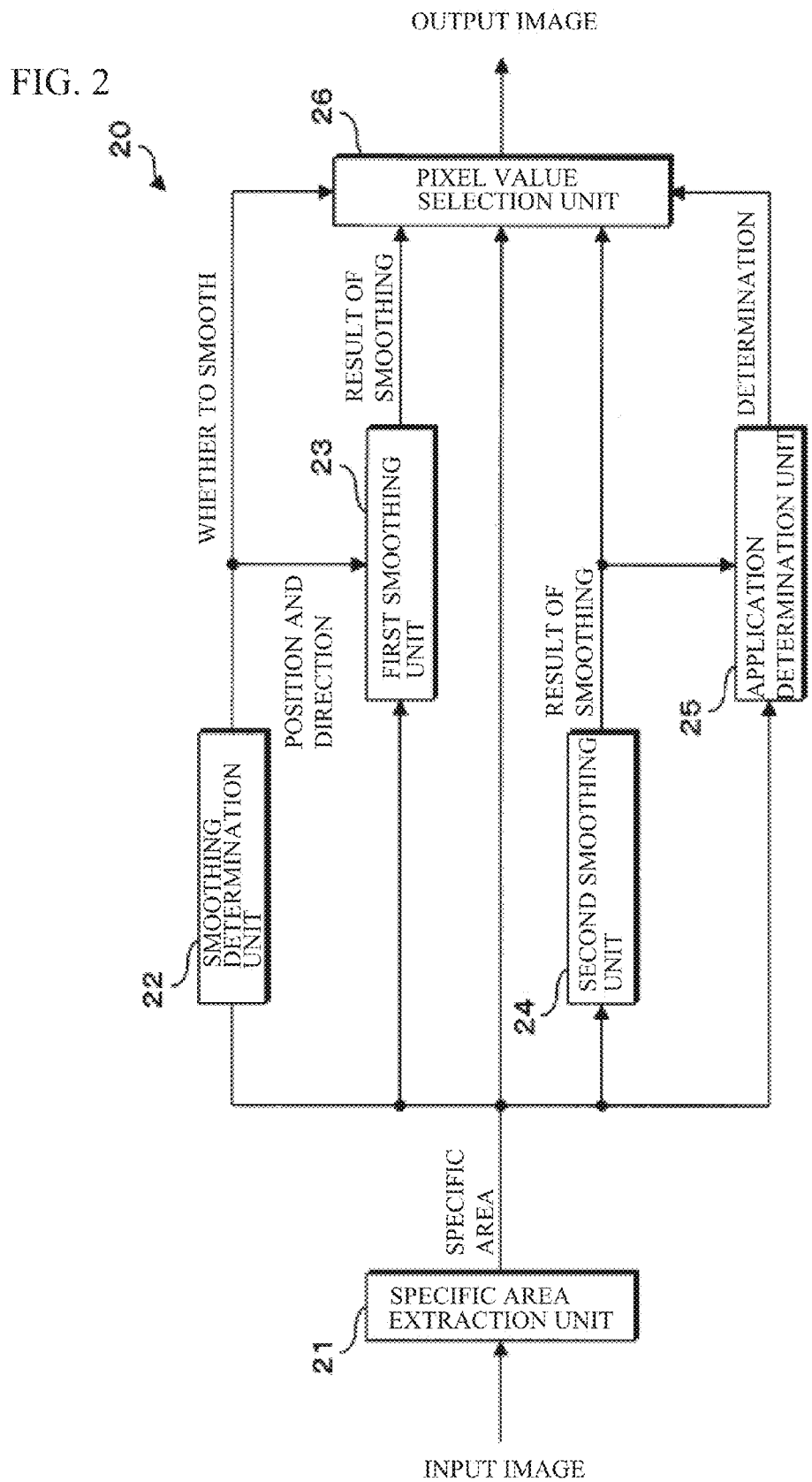
FIG. 2 is a block diagram showing an example configuration of an image processing unit.

FIG. 2 is a block diagram showing an example configuration of the image processing unit 20 and shows blocks related to a process of eliminating noise from an input image. The image processing unit 20 includes a specific area extraction unit 21 that extracts an area having a specific size from the input image. The specific area extraction unit 21 extracts a specific area centered on one pixel (hereafter referred to as the target pixel) in the input image and consisting of, for example, 5×5 pixels. The specific area extracted by the specific area extraction unit 21 is provided to a smoothing determination unit 22, a first smoothing unit 23, a second smoothing unit 24, an application determination unit 25, and a pixel value selection unit 26.

The smoothing determination unit 22 determines whether to smooth the target pixel in the specific area extracted by the specific area extraction unit 21 by checking the values of the multiple pixels in the specific area, changes in the values, and the like. The smoothing determination unit 22 then notifies the pixel value selection unit 26 of the determination as to whether to perform a smoothing process. If a noise boundary is present in the specific area, the smoothing determination unit 22 determines the direction and position of the noise boundary in the specific area. The smoothing determination unit 22 then provides the determined direction and position of the noise boundary to the first smoothing unit 23.

The first smoothing unit 23 stores multiple smoothing filters. It smoothes the input image by selecting one of these smoothing filters and filtering the specific area using the selected smoothing filter. At this time, the first smoothing unit 23 selects the one smoothing filter on the basis of the direction and position of the noise boundary provided by the smoothing determination unit 22. The first smoothing unit 23 then provides the result obtained by smoothing the specific area using the smoothing filter, that is, the smoothed value of the target pixel in the specific area to the pixel value selection unit 26.

The second smoothing unit 24 filters the specific area using an edge-preserving smoothing filter. The edge-preserving smoothing filter can smooth the specific area while preserving a high-frequency component (edge, etc.) in the specific area, that is, it can filter the specific area without significantly degrading the image quality. The second smoothing unit 24 stores multiple edge-preserving smoothing filters corresponding to edge directions. It determines the direction of an edge in the specific area and smoothes the specific area using a filter corresponding to the edge direction. The second smoothing unit 24 then provides the result obtained by smoothing the specific area using the edge-preserving smoothing filter, that is, the smoothed value of the target pixel in the specific area to the pixel value selection unit 26. The result of the smoothing process performed by the second smoothing unit 24 is also provided to the application determination unit 25.

The application determination unit 25 determines whether to apply the result of the smoothing process performed by the second smoothing unit 24, on the basis of the characteristics of the pixel values in the specific area and/or the result of the smoothing process performed by the second smoothing unit 24, and the like. For example, the application determination unit 25 makes this determination on the basis of the amount of the edge component in the specific area, the change pattern of the pixel values in the specific area, and/or the differences between the pixel values before and after the smoothing process performed by the second smoothing unit 24, and the like. The application determination unit 25 provides the determination to the pixel value selection unit 26.

The pixel value selection unit 26 receives the three values of the target pixel in the input image, that is, the pixel value smoothed by the first smoothing unit, the pixel value smoothed by the second smoothing unit, and the original pixel value, which has yet to be smoothed. The pixel value selection unit 26 then selects one of the received three pixel values on the basis of the determination as to whether to perform smoothing made by the smoothing determination unit 22 and the determination made by the application determination unit 25 and outputs the selected pixel value.

If the smoothing determination unit 22 determines that a smoothing process is to be performed, the pixel value selection unit 26 selects the pixel value smoothed by the first smoothing unit 23 and outputs it. If the smoothing determination unit 22 determines that a smoothing process is not to be performed and the application determination unit 25 determines that the result of the smoothing process performed by the second smoothing unit 24 is to be applied, the pixel value selection unit 26 selects the pixel value smoothed by the second smoothing unit 24 and outputs it. If the smoothing determination unit 22 determines that a smoothing process is not to be performed and the application determination unit 25 determines that the result of the smoothing process performed by the second smoothing unit 24 is not to be applied, the pixel value selection unit 26 selects the original pixel value, which is yet to be smoothed, and outputs it.

The units from the specific area extraction unit 21 to pixel value selection unit 26 perform the above processes on all the pixels of the input image. Thus, the image processing unit 20 generates an output image and outputs it to the panel drive unit 18. While the image processing unit 20 shown in the block diagram of FIG. 2 is configured to perform processes in the first smoothing unit 23, second smoothing unit 24, and the like in parallel and to finally select among the process results, other configurations may be used. For example, the image processing unit 20 may be configured to sequentially determine whether a criterion for performing a smoothing process is satisfied and to, if the criterion is satisfied, perform one of the smoothing processes, as shown below.

Figure 3:
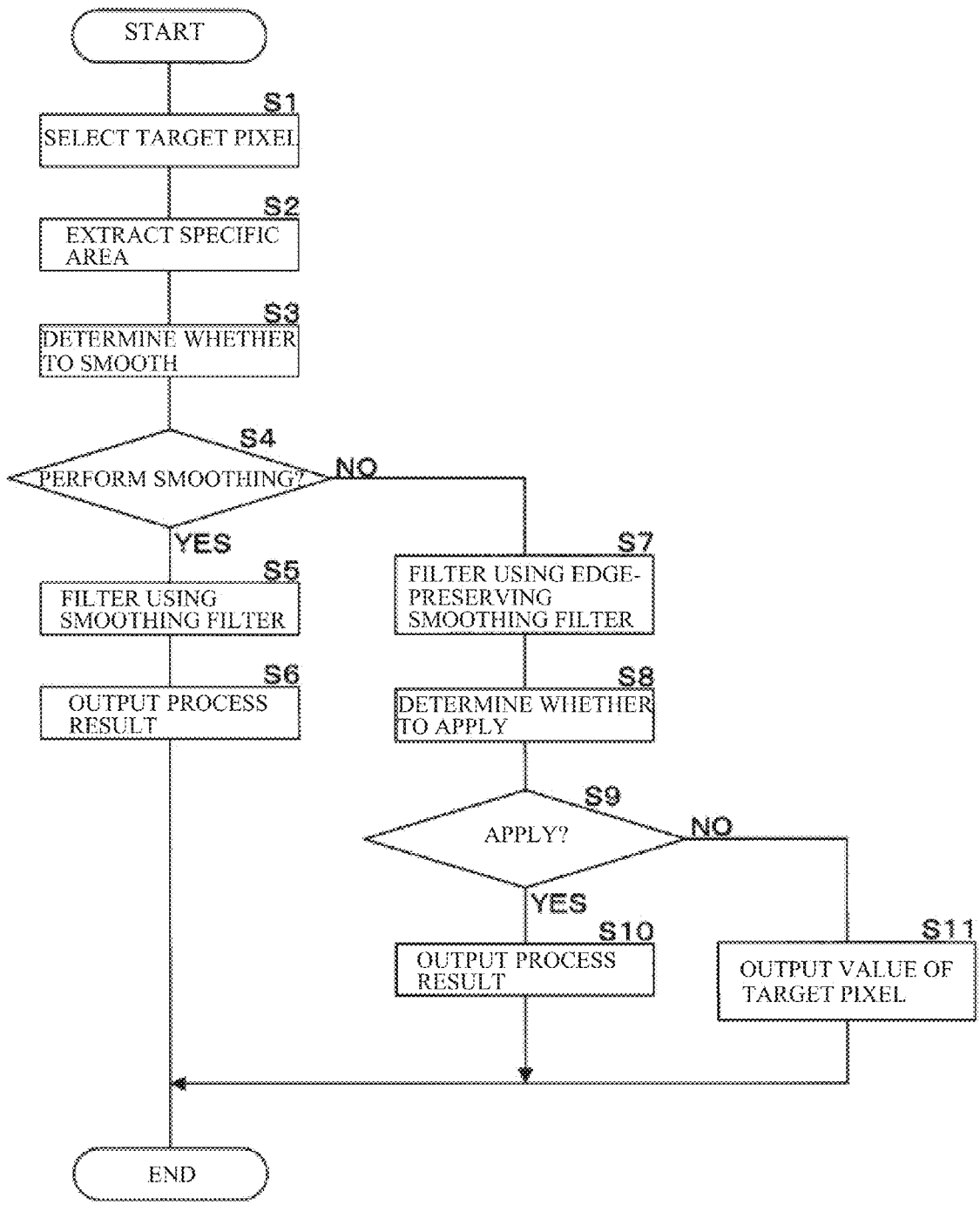
FIG. 3 is a flowchart showing an example of the steps of a noise elimination process performed by the image processing unit.

FIG. 3 is a flowchart showing an example of the steps of a noise elimination process performed by the image processing unit 20. The image processing unit 20 selects one pixel as the target pixel in the input image from the image decompression unit 17 (step S1) and extracts a specific area including the target pixel and having a predetermined size (step S2). The image processing unit 20 then determines whether to perform a smoothing process on the target pixel in the extracted specific area (step S3).

If the image processing unit 20 determines that a smoothing process is to be performed (S4: YES), it filters the specific area using a smoothing filter (step S5). This smoothing filter is selected from among the previously stored multiple smoothing filters on the basis of the direction and position of the noise boundary determined in the smoothing determination process. The image processing unit 20 then outputs, as the process result, the value of the target pixel filtered by the smoothing filter (step S6).

If the image processing unit 20 determines that a smoothing process is not be performed (S4: NO), it filters the specific area using an edge-preserving smoothing filter (step S7), as well as determines whether to apply the result of such a filtering process (step S8). The edge-preserving smoothing filter is selected from among the previously stored multiple edge-preserving smoothing filters on the basis of the direction of the edge in the specific area, and the like. The image processing unit 20 makes this application determination on the basis of one or more criteria, that is, one or more of the amount of the edge component in the specific area, the change pattern of the pixel values in the specific area, the result of the smoothing in step S7, and the like.

If the image processing unit 20 determines that the result of the filtering process performed using the edge-preserving smoothing filter is to be applied (S9: YES), it outputs, as the process result, the value of the target pixel filtered in this filtering process (step S10). If not so determined (S9: NO), the image processing unit 20 outputs the pixel value of the target pixel selected in step S1 (step S11).

The image processing unit 20 generates an output image by repeatedly performing steps S1 to S11 described above on all the pixels of the input image. The value of each pixel in the output image generated is one of a pixel value obtained by filtering the value of the corresponding pixel in the input image using the smoothing filter, a pixel value obtained by filtering the value of the corresponding pixel using the edge-preserving smoothing filter, and the yet-to-be-smoothed, pixel value (the same pixel value as that in the input image). Thus, the output image is obtained as an image in which stepwise noise such as block noise has been eliminated or reduced from the input image.

<1. Smoothing Determination Process>
<1-1. Outline of Process>

Figure 4:
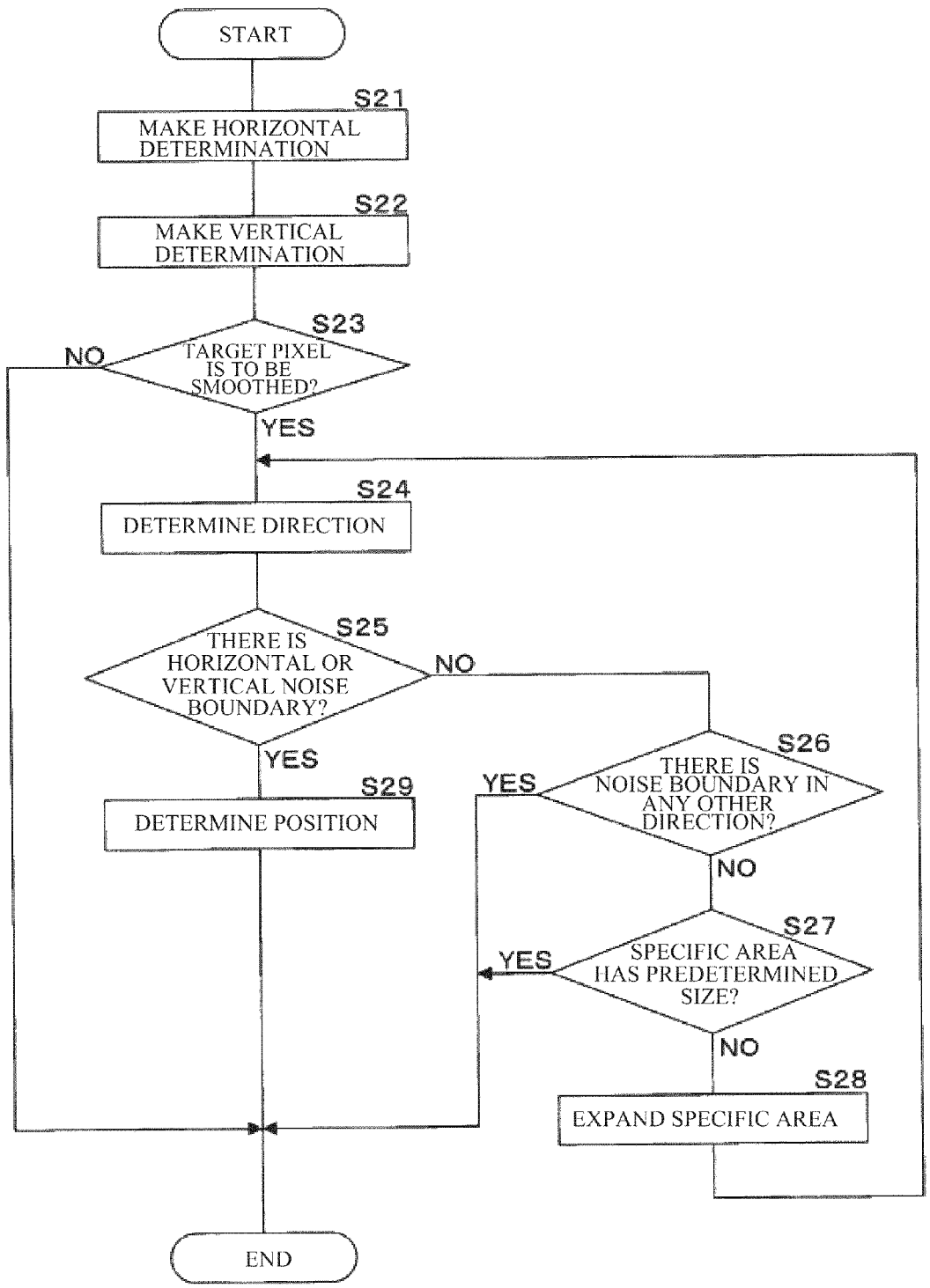
FIG. 4 is a flowchart schematically showing the steps of a smoothing determination process performed by the image processing unit.

Next, the smoothing determination process performed by the image processing unit 20 will be described. The smoothing determination process is a process performed by the smoothing determination unit 22 in FIG. 2, in step S3 of FIG. 3. FIG. 4 is a flowchart schematically showing the steps of the smoothing determination process performed by the image processing unit 20. First, the image processing unit 20 makes a horizontal (transverse) determination (step S21) and a vertical (longitudinal) determination (step S22) as to the specific area extracted from the input image. Thus, the image processing unit 20 determines whether to smooth the target pixel in the specific area (step S23). If the image processing unit 20 determines that the target pixel is not to be smoothed (S23: NO), the image processing unit 20 ends the smoothing determination process.

If the image processing unit 20 determines that the target pixel is to be smoothed (S23: YES), it determines whether there is a noise boundary extending horizontally or vertically in the specific area (step S24).

If the image processing unit 20 determines that there is no horizontally or vertically extending noise boundary (S25: NO), it determines whether there is a noise boundary extending in any other direction in the specific area (step S26). Examples of a noise boundary extending in any other direction include noise boundaries extending diagonally in directions of 45°, 135°, and the like and noise boundaries extending horizontally or vertically in the specific area and having L, T, cross, and other shapes. If the image processing unit 20 determines that there is a noise boundary extending in any other direction (S26: YES), it ends the smoothing determination process.

A specific area in which there is no noise boundary extending in any direction can be regarded as an area corresponding to an internal area of block noise. Accordingly, if the image processing unit 20 determines that there is no noise boundary extending in any other direction in the specific area (S26: NO), it determines whether the specific area has a predetermined size (step S27). If the specific area does not have the predetermined size (S27: NO), the image processing unit 20 expands the specific area (step S28) and returns to step S24 to re-determine the direction of a noise boundary. If the specific area has the predetermined size (S27: YES), the image processing unit 20 ends the smoothing determination process.

If the image processing unit 20 determines that there is a noise boundary extending horizontally or vertically in the specific area (S25: YES), it determines the position of the noise boundary in the specific area (step S29), ending the smoothing determination process.

<1-2. Horizontal/Vertical Determination>

Figure 5:
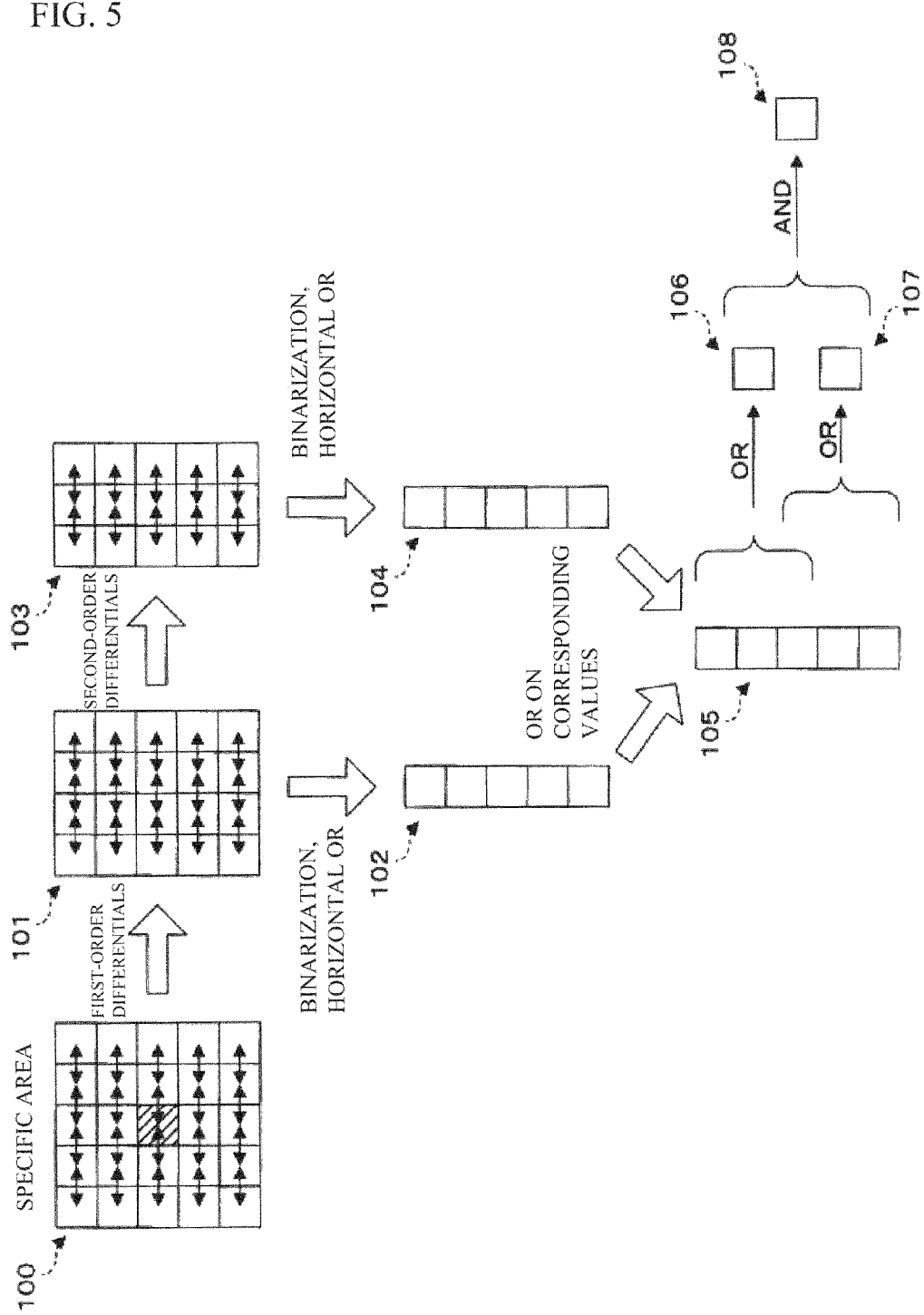
FIG. 5 is a schematic diagram showing a horizontal determination process in step S21.

FIG. 5 is a schematic diagram showing the horizontal determination process in step S21. The image processing unit 20 selects one pixel as the target pixel in the input image and extracts a specific area 100 including the target pixel and having a predetermined size (5×5 pixels in the example shown in FIG. 5). In FIG. 5, the target pixel in the specific area 100 is hatched. In the horizontal determination process, first, the image processing unit 20 calculates the first-order differentials between the values of the horizontally adjacent pixels in the specific area 100 (that is, the differences between the values of the adjacent pixels). Thus, the image processing unit 20 obtains a horizontal first-order differential matrix 101 consisting of the 4×5 first-order differentials. The image processing unit 20 then compares the absolute values of the first-order differentials in the horizontal first-order differential matrix 101 with a predetermined threshold to binarize the horizontal first-order differential matrix 101 (e.g., a first-order differential whose absolute value is greater than or equal to the threshold is binarized into 1; a first-order differential whose absolute value is smaller than the threshold is binarized into 0). The image processing unit 20 then performs an OR operation on the horizontally arranged, binarized four first-order differentials, thereby obtaining a horizontal first-order differential OR column 102 consisting of the five operation results.

The image processing unit 20 also calculates the differentials (i.e., second-order differentials) between the horizontally adjacent first-order differentials in the horizontal first-order differential matrix 101, thereby obtaining a horizontal second-order differential matrix 103 consisting of the 3×5 second-order differentials. The image processing unit 20 then compares the absolute values of the second-order differentials in the horizontal second-order differential matrix 103 with a predetermined threshold to binarize the horizontal second-order differential matrix 103 (e.g., a second-order differential whose absolute value is greater than or equal to the threshold is binarized into 1; a second-order differential whose absolute value is smaller than the threshold is binarized into 0). The image processing unit 20 then performs an OR operation on every three horizontally arranged, binarized second-order differentials, thereby obtaining a horizontal second-order differential OR column 104 consisting of the five operation results. The threshold for binarizing the first-order differentials and the threshold for binarizing the second-order differentials may be the same or different. These thresholds are determined in the design stage of the display device 1 or other stages.

The image processing unit 20 then performs an OR operation on the two values in each corresponding position between the horizontal first-order differential OR column 102 and horizontal second-order differential OR column 104, thereby obtaining a horizontal OR column 105 consisting of the five operation results. The image processing unit 20 then performs an OR operation on the upper three values (i.e., the first to third values) in the horizontal OR column 105, thereby obtaining a horizontal upper OR value 106, and performs an OR operation on the lower three values (i.e., the third to fifth values) therein, thereby obtaining a horizontal lower OR value 107. The image processing unit 20 then performs an AND operation on the horizontal upper OR value 106 and horizontal lower OR value 107, thereby obtaining a horizontal determination result 108.

The horizontal determination result 108 thus obtained is one bit information, whose value is "0" or "1." The horizontal determination result 108 indicates whether the target pixel in the specific area 100 is included in a low-frequency component block where changes in pixel value in the horizontal direction are constant and small. A horizontal determination result 108 of "0" indicates that the target pixel may be included in a low-frequency component block. In contrast, a horizontal determination result 108 of "1" indicates that the target pixel is not included in a low-frequency component block (that is, cannot act as block noise).

Figure 6:
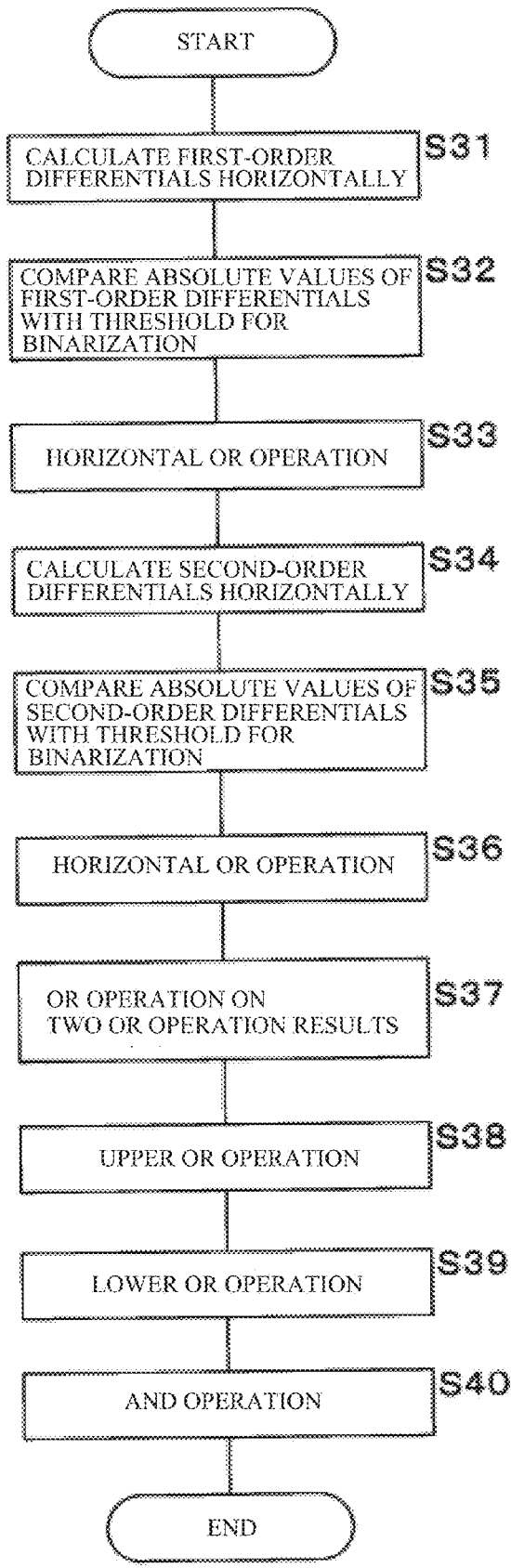
FIG. 6 is a flowchart showing the steps of the horizontal determination process performed by the image processing unit.

FIG. 6 is a flowchart showing the steps of the horizontal determination process performed by the image processing unit 20. First, the image processing unit 20 calculates the first-order differentials between the horizontally adjacent pixels in the specific area 100 (step S31). The image processing unit 20 then compares the absolute values of the calculated first-order differentials with the threshold to binarize the first-order differentials (step S32) and then performs an OR operation on the horizontally arranged, binarized first-order differentials in each row (step S33). The image processing unit 20 also calculates the second-order differentials between the horizontally adjacent ones of the first-order differentials obtained in step S31 (step S34). The image processing unit 20 then compares the absolute values of the calculated second-order differentials with the threshold to binarize the second-order differentials (step S35) and then performs an OR operation on the horizontally arranged, binarized second-order differentials in each row (step S36).

The image processing unit 20 then performs OR operations on the operation result in step S33 and operation result in step S36 in the corresponding positions, thereby obtaining multiple OR operation values (step S37). The image processing unit 20 then performs an OR operation on the upper half of the OR operation values (step S38) and performs an OR operation on the lower half thereof (step S39). The image processing unit 20 then performs an AND operation on the operation result in step S38 and the operation result in step S39 (step S40), ending the horizontal determination process.

Figure 7:
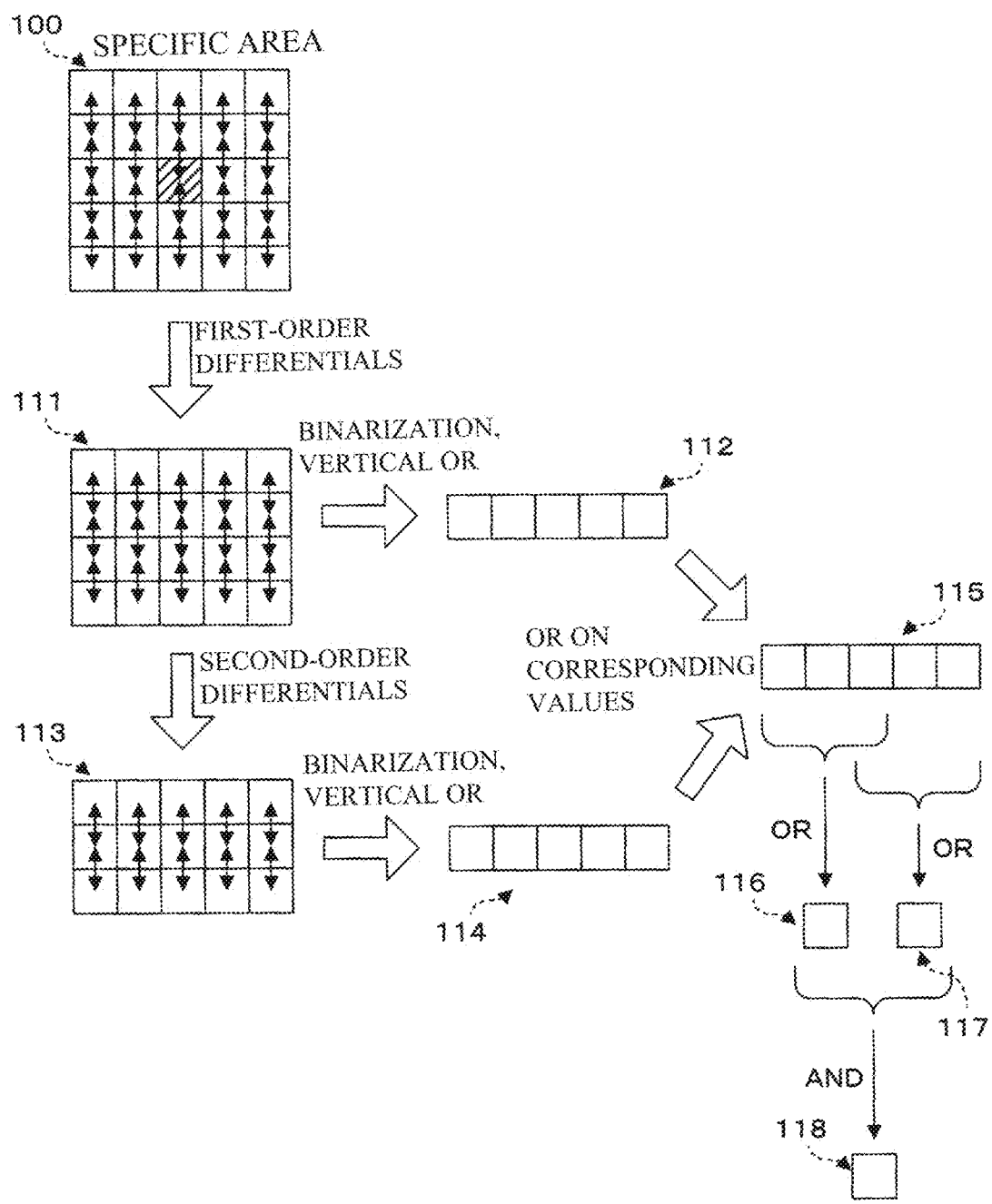
FIG. 7 is a schematic diagram showing a vertical determination process in step S22.

FIG. 7 is a schematic diagram showing the vertical determination process in step S22. Note that the vertical determination process is approximately the same as the horizontal determination process except that it differs therefrom in the operation direction. In the vertical determination process, first, the image processing unit 20 calculates the first-order differentials between the values of the vertically adjacent pixels in the specific area 100, thereby obtaining a vertical first-order differential matrix 111 consisting of the 5×4 first-order differentials. The image processing unit 20 then compares the absolute values of the first-order differentials in the vertical first-order differential matrix 111 with a predetermined threshold to binarize the vertical first-order differential matrix 111. The image processing unit 20 then performs an OR operation on the vertically arranged, binarized four first-order differentials in each column, thereby obtaining a vertical first-order differential OR row 112 consisting of the five operation results.

The image processing unit 20 also calculates the differentials (i.e., second-order differentials) between the vertically adjacent first-order differentials in the vertical first-order differential matrix 111, thereby obtaining a vertical second-order differential matrix 113 consisting of the 3×5 second-order differentials. The image processing unit 20 then compares the absolute values of the second-order differentials in the vertical second-order differential matrix 113 with a predetermined threshold to binarize the vertical second-order differential matrix 113. The image processing unit 20 then performs an OR operation on the vertically arranged, binarized three second-order differentials in each column, thereby obtaining a vertical second-order differential OR row 114 consisting of the five operation results.

The image processing unit 20 then performs an OR operation on the two values in each corresponding position between the vertical first-order differential OR row 112 and vertical second-order differential OR row 114, thereby obtaining a vertical OR row 115 consisting of the five operation results. The image processing unit 20 then performs an OR operation on the upper three values in the vertical OR row 115, obtaining a vertical upper OR value 116, as well as performs an OR operation on the lower three values therein, obtaining a vertical lower OR value 117. The image processing unit 20 then performs an AND operation on the vertical upper OR value 116 and vertical lower OR value 117, thereby obtaining a vertical determination result 118.

The vertical determination result 118 thus obtained is one bit information, whose value is "0" or "1." The vertical determination result 118 indicates whether the target pixel in the specific area 100 is included in a low-frequency component block where the changes in pixel value in the vertical direction are constant and small. When the value of the vertical determination result 118 is "0," this means that the target pixel may be included in a low-frequency component block. When the value of the horizontal determination result 108 is "0" and when the value of the vertical determination result 118 is "0," it can be determined that the target pixel is included in a low-frequency component block. When the value of the vertical determination result 118 of "1," this means that the target pixel is not included in a low-frequency component block.

Note that the vertical determination process is approximately the same as the horizontal determination process and therefore a flowchart thereof is omitted. A flowchart showing the vertical determination process can be obtained by reading the term "horizontal" in the flowchart of the horizontal determination process shown in FIG. 6 as "vertical."

The image processing unit 20 determines whether to smooth the target pixel in the specific area 100, on the basis of the horizontal determination result 108 obtained in the horizontal determination process and the vertical determination result 118 obtained in the vertical determination process. Specifically, if the value of the horizontal determination result 108 is "0" and if the value of the vertical determination result 118 is "0," the image processing unit 20 determines that the target pixel is to be smoothed and performs the following process. In contrast, if the value of one of the horizontal determination result 108 or vertical determination result 118 is "1," the image processing unit 20 determines that the target pixel is not to be smoothed, ending the smoothing determination process.

<1-3. Noise Boundary Direction Determination Process>

If the image processing unit 20 determines that the target pixel in the specific area 100 is to be smoothed, it determines the extending direction of the noise boundary in the specific area 100. FIG. 8 includes schematic diagrams showing the noise boundary direction determination process. In the noise boundary direction determination process, the image processing unit 20 determines which of a horizontal pattern shown in FIG. 8A, a vertical pattern shown in FIG. 8B, an internal pattern shown in FIG. 8C, and other patterns shown in FIG. 8D represents the direction of a noise boundary in the specific area 100. The horizontal pattern of FIG. 8A is a pattern in which a noise boundary extends in the horizontal direction (transverse direction) of the specific area 100. The vertical pattern of FIG. 8B is a pattern in which a noise boundary extends in the vertical direction (longitudinal direction) of the specific area 100. The internal pattern of FIG. 8C is a pattern in which the specific area 100 includes no noise boundary but rather is the internal area of block noise. The patterns of FIG. 8D are examples of patterns other than those of FIGS. 8A to 8C.

The image processing unit 20 then determines the direction of a noise boundary using the data generated in the above vertical and horizontal determination processes. Specifically, the image processing unit 20 uses the horizontal OR column 105 generated in the horizontal determination process and the vertical OR row 115 generated in the vertical determination process. The image processing unit 20 determines whether all the five values in the horizontal OR column 105 (more than five values if the specific area 100 is expanded) are "0." Similarly, the image processing unit 20 determines whether all the five values in the vertical OR row 115 are "0." If all the values in the horizontal OR column 105 are "0," the pixel value in the specific area 100 varies smoothly in the horizontal direction. If all the values in the vertical OR row 115 are "0," the pixel value in the specific area 100 varies smoothly in the vertical direction.

If not all the values in the horizontal OR column 105 are "0" and if all the values in the vertical OR row 115 are "0," the image processing unit 20 determines that the noise boundary in the specific area 100 is the horizontal pattern of FIG. 8A. If all the values in the horizontal OR column 105 are "0" and if not all the values in the vertical OR row 115 are "0," the image processing unit 20 determines that the noise boundary in the specific area 100 is the vertical pattern of FIG. 8B. If all the values in the horizontal OR column 105 are "0" and if all the values in the vertical OR row 115 are "0," the image processing unit 20 determines that the specific area 100 is the internal pattern of FIG. 8C (that is, the specific area 100 is an area surrounded or sandwiched by or adjacent to the noise boundary in the input image). If not all the values in the horizontal OR column 105 are "0" and if not all the values in the vertical OR row 115 are "0," the image processing unit 20 determines that the noise boundary in the specific area 100 is one of the other patterns of FIG. 8D.

If the image processing unit 20 determines in the noise boundary direction determination process that the specific area 100 is the internal pattern of FIG. 8C, it expands the specific area 100, for example, to 5×5 pixels, then to 7×7 pixels, and then to 9×9 pixels, and the like. The image processing unit 20 then calculates a horizontal OR column 105 and a vertical OR row 115 with respect to the expanded specific area 100 in manners similar to those shown in FIGS. 5 to 7. The image processing unit 20 then determines which of the patterns shown in FIGS. 8A to 8D represents the direction of a noise boundary in the expanded specific area 100, on the basis of the calculated horizontal OR column 105 and vertical OR row 115. The image processing unit 20 expands the specific area 100 and repeats the above process until it determines that the noise boundary in the expanded specific area 100 is the horizontal pattern of FIG. 8A, the vertical pattern of FIG. 8B, or any of the other patterns of FIG. 8D or until the size of the specific area 100 becomes a predetermined size (e.g., 9×9 pixels). When the specific area 100 reaches the predetermined size, the image processing unit 20 no longer expands the specific area 100, ending the smoothing determination process.

<1-4. Noise Boundary Position Determination Process>

Figure 9:
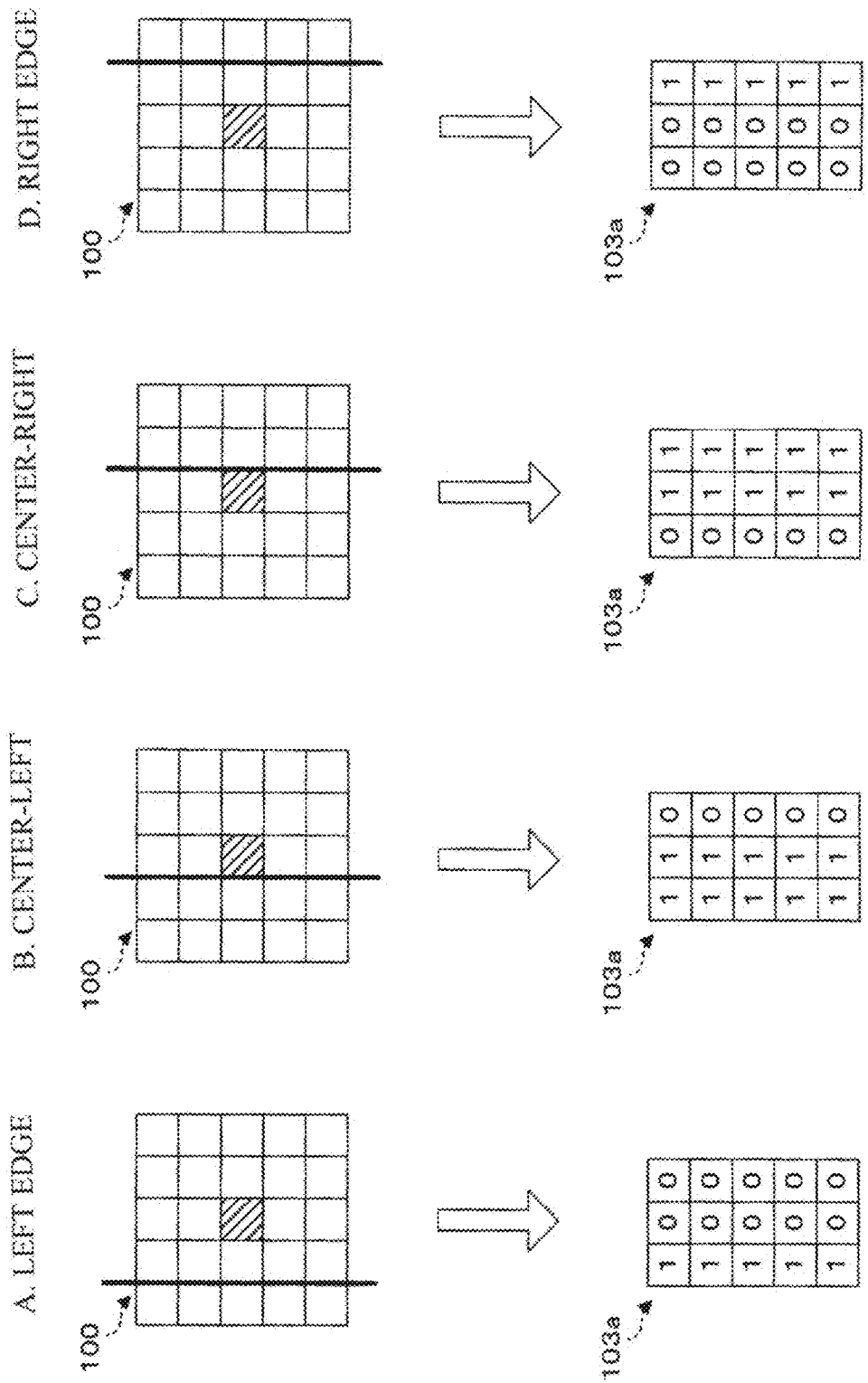
FIG. 9 is a schematic diagram showing a noise boundary position determination process.

If the direction of the noise boundary in the specific area 100 is the horizontal pattern of FIG. 8A or the vertical pattern of FIG. 8B, the image processing unit 20 determines the position of the noise boundary in the specific area 100. FIG. 9 includes schematic diagrams showing the noise boundary position determination process and shows cases in which the noise boundary in the specific area 100 is a vertical pattern. The position of the vertical noise boundary in the specific area 100 consisting of 5×5 pixels is one of four positions shown in FIGS. 9A to 9D. Note that the position determination process when the noise boundary is a horizontal pattern is approximately the same as that when the noise boundary is a vertical pattern and therefore will not be described.

The image processing unit 20 then performs the noise boundary position determination process using the data generated in the above horizontal determination process. Specifically, the image processing unit 20 compares the horizontal second-order differential matrix 103 generated in the horizontal determination process with a threshold to binarize the horizontal second-order differential matrix 103 and then uses the obtained binarized horizontal second-order differential matrix 103a in the noise boundary position determination process. For example, if the noise boundary lies at the left edge of the specific area 100 as shown in FIG. 9A, the 3×5 binarized horizontal second-order differential matrix 103a forms a pattern whose first column includes "1s" and whose second and third columns each include "0s." If the noise boundary lies at a position which is in the center of the specific area 100 and is slightly closer to the left edge, as shown in FIG. 9B, the 3×5 binarized horizontal second-order differential matrix 103a forms a pattern whose first and second columns each include "1s" and whose third column includes "0s." If the noise boundary lies at a position which is in the center of the specific area 100 and is slightly closer to the right edge, as shown in FIG. 9C, the 3×5 binarized horizontal second-order differential matrix 103a forms a pattern whose second and third columns each include "1s" and whose first column includes "0s." If the noise boundary lies at the right edge of the specific area 100 as shown in FIG. 9D, the 3×5 binarized horizontal second-order differential matrix 103a forms a pattern whose third column includes "1s" and whose first and second columns each include "0s."

Accordingly, the image processing unit 20 can determine the position of the noise boundary in the specific area 100 by checking the disposition pattern of "0s" and "1s" included in the binarized horizontal second-order differential matrix 103a generated based on the horizontal second-order differential matrix 103 generated in the horizontal determination process. The position of the horizontal noise boundary is also determined in a similar manner. The image processing unit 20 can determine the position of the horizontal noise boundary in the specific area 100 by generating a binarized vertical second-order differential matrix by comparing the vertical second-order differential matrix 113 generated in the vertical determination process with a threshold and then checking the disposition pattern of "0s" and "1s" in this binarized vertical second-order differential matrix.

<2. Smoothing Process>

If the image processing unit 20 determines in the above smoothing determination process that the value of the target pixel in the specific area 100 is to be smoothed, it smoothes the pixel value. At this time, the image processing unit 20 selects one of the multiple smoothing filters stored therein on the basis of the direction determined in the noise boundary direction determination process, the position determined in the noise boundary position determination process, and the like and then smoothes the pixel of the target pixel in the specific area 100 using the selected smoothing filter.

FIGS. 10 and 11 include schematic diagrams each showing an example smoothing filter. A smoothing filter used to smooth the specific area 100 consisting of 5×5 pixels has a 5×5 size. The image processing unit 20 uses, as the smoothed value of the target pixel, a value A obtained by performing a matrix operation A=(a11×f11+a12×f12+ . . . +a55×f55)/(f11+f12+ . . . +f55). In this matrix operation, aij (i=1 to 5, j=1 to 5) represents the value of each pixel in the specific area; and fij (i=1 to 5, j=1 to 5) represents the value of smoothing filter corresponding to the each pixel. This operation method is also used in filtering processes using other filters (edge-preserving smoothing filter, Sobel filter, Laplacian filter, and the like) described below.

FIG. 10A shows an example of a smoothing filter used when the noise boundary in the specific area 100 is a vertical pattern. In the smoothing filter of FIG. 10A, the five values in the third row are set to 1, and the values in the other rows are set to 0. Use of the smoothing filter of FIG. 10A allows for calculation of the average value between the target pixel and the four pixels on the left and right sides of the target pixel in the specific area 100. The image processing unit 20 then outputs the average value of the five pixels as the smoothed target pixel. As seen above, the smoothing filter of FIG. 10A smoothes the target pixel by calculating the average value of the pixels in a direction crossing the vertical noise boundary.

As with FIG. 10A, FIG. 10B shows an example of a smoothing filter used when the noise boundary in the specific area 100 is a vertical pattern. Note that the smoothing filter of FIG. 10B further considers the position of the noise boundary and is used when the noise boundary at a position which is in the center of the specific area 100 and is slightly closer to the left edge, as shown in FIG. 9B. In the smoothing filter of FIG. 10B, the center value is set to 3, the value leftward adjacent thereto to 2, and the other values to 0. Use of the smoothing filter of FIG. 10B allows for calculation of the weighted average value between the target pixel and the pixel leftward adjacent thereto in the specific area 100. The image processing unit 20 outputs this average value as the smoothed target pixel.

FIG. 10C shows an example of a smoothing filter used when the noise boundary in the specific area 100 is a horizontal pattern. In the smoothing filter of FIG. 10C, the five values in the third column are set to 1, and the values in the other columns are set to 0. Use of the smoothing filter of FIG. 10C allows for calculation of the average value between the target pixel and the four pixels on the upper and lower sides of the target pixel in the specific area 100. The image processing unit 20 outputs the average value of the five pixels as the smoothed target pixel. As seen above, the smoothing filter of FIG. 10C smoothes the target pixel by calculating the average value of the pixels in a direction crossing the horizontal noise boundary.

FIG. 11D shows an example of a smoothing filter used when the noise boundary in the specific area 100 is any other pattern. In the smoothing filter of FIG. 11D, all the 5×5=25 values are set to 1. Use of the smoothing filter of FIG. 11D allows for calculation of the average value of all the pixels in the specific area 100. The image processing unit 20 outputs this average value as the smoothed target pixel.

FIG. 11E shows an example of a smoothing filter used in a specific area 100 which includes no noise boundary when being 5×5 pixels but includes a noise boundary when expanded to 7×7 pixels. The smoothing filter of FIG. 11E is obtained by expanding the smoothing filter of FIG. 11D and is used when the noise boundary is any other pattern. Similarly, the smoothing filters of FIGS. 10A to 10C can be expanded to a 7×7 size. Use of the smoothing filter of FIG. 11E allows for calculation of the average value of all the pixels in the expanded specific area 100. The image processing unit 20 outputs this average value as the smoothed target pixel.

As seen above, the image processing unit 20 selects a smoothing filter on the basis of the direction and position of the noise boundary, and the like, smoothes the value of the target pixel using the selected smoothing filter, and outputs the smoothed pixel value. Note that the smoothing filters shown in FIGS. 10 and 11 are only illustrative. Further, the image processing unit 20 may be configured to determine the presence or absence of a noise boundary but not to determine the direction or position thereof and to, when it determines that the specific area 100 includes a noise boundary, filter the specific area 100 using the smoothing filters shown in FIG. 11.

<3. Edge-Preserving Smoothing>

<3-1. Edge-Preserving Smoothing Filter>

If the image processing unit 20 determines in the above smoothing determination process that the value of the target pixel in the specific area 100 is not to be smoothed, it smoothes the pixel of the target pixel using an edge-preserving smoothing filter. Specifically, the image processing unit 20 determines the direction of an edge component in the specific area 100, selects one of the multiple edge-preserving smoothing filters stored in the image processing unit 20 on the basis of the determined direction of the edge component, and smoothes the value of the target pixel in the specific area 100 using the selected edge-preserving smoothing filter.

FIGS. 12 to 14 include schematic diagrams each showing an example of an edge-preserving smoothing filter. In the present embodiment, the image processing unit 20 determines which of eight directions, that is, the horizontal direction (0°), a diagonal direction of 45°, the vertical direction (90°), a diagonal direction of 135°, a diagonal direction of 22.5°, a diagonal direction of 67.5°, a diagonal direction of 112.5°, and a diagonal direction of 157.5° represents the direction of the edge component in the specific area 100 or determines whether the edge component has no direction. For this reason, the image processing unit 20 stores eight edge-preserving smoothing filters corresponding to the eight directions and an isotropic smoothing filter corresponding to a no-direction determination, which is not of edge-preserving type.

A filter shown in FIG. 12A is a smoothing filter which preserves a horizontal edge component. If the image processing unit 20 determines that the direction of the edge component in the specific area 100 is horizontal, it performs a smoothing process using the filter of FIG. 12A. By performing a filtering process using the filter of FIG. 12A, the image processing unit 20 calculates the weighted average value between the value of the target pixel and the values of the four pixels on the left and right sides of the target pixel along the direction of the edge component in the specific area 100. For weighting, larger weights are assigned to the values of pixels closer to the target pixel. The image processing unit 20 outputs the calculated average value as the smoothed target pixel.

A filter shown in FIG. 12B is a smoothing filter for preserving an edge component in a diagonal direction of 45° and can calculate the weighted average value between the value of the target pixel and the values of the four pixels located in a diagonal direction of 45° with respect thereto. Similarly, a filter shown in FIG. 12C is a smoothing filter for preserving an edge component in the vertical (90°) direction. A filter shown in FIG. 12D is a smoothing filter for preserving an edge component in a diagonal direction of 135°.

A filter shown in FIG. 13E is a smoothing filter for preserving an edge component in a diagonal direction of 22.5° and can calculate the weighted average value between the value of the target pixel and the values of the six pixels located in a diagonal direction of 22.5° with respect thereto. Similarly, a filter shown in FIG. 13F is a smoothing filter for preserving an edge component in a diagonal direction of 67.5°. A filter shown in FIG. 13G is a smoothing filter for preserving an edge component in a diagonal direction of 112.5°. A filter shown in FIG. 13H is a smoothing filter for preserving an edge component in a diagonal direction of 157.5°.

A smoothing filter shown in FIG. 14 is used when it is determined that the direction of the edge component in the specific area 100 does not correspond to any of the above eight directions. This smoothing filter can assign weights to the values of all the pixels in the specific area 100 on the basis of the distances from the target pixel and calculate the average value among the resulting values.

Based on the edge-preserving smoothing filters corresponding to the eight directions shown in FIGS. 12 and 13, a smoothing filter X that preserves an edge in a direction of any angle x (0°<x<180°) can be generated using formulas below. In those formulas, A represents the 0°-direction edge-preserving smoothing filter shown in FIG. 12A, B represents the 45°-direction edge-preserving smoothing filter shown in FIG. 12B, C represents the 90°-direction edge-preserving smoothing filter shown in FIGS. 12C, and D represents the 135°-direction edge-preserving smoothing filter shown in FIG. 12D, E represents the 22.5°-direction edge-preserving smoothing filter shown in FIG. 13E, F represents the 67.5°-direction edge-preserving smoothing filter shown in FIG. 13F, G represents the 112.5°-direction edge-preserving smoothing filter shown in FIGS. 13G, and H represents the 157.5°-direction edge-preserving smoothing filter shown in FIG. 13H.

If 0°<x<22.5°, then $X=\alpha A+(1-\alpha)E$

If 22.5°<x<45°, then $X=\alpha E+(1-\alpha)B$

If 45°<x<67.5°, then $X=\alpha B+(1-\alpha)F$

If 67.5°<x<90°, then $X=\alpha F+(1-\alpha)C$

If 90°<x<112.5°, then $X=\alpha C+(1-\alpha)G$

If 112.5°<x<135°, then $X=\alpha G+(1-\alpha)D$

If 135°<x<157.5°, then $X=\alpha D+(1-\alpha)H$

If 157.5°<x<180°, then $X=\alpha H+(1-\alpha)A$

In the above formulas, α represents a coefficient depending on an angle x and being more than 0 and less than 1. For example, if x=10°, then α=(10−0)/(22.5−0)=0.44. For example, if x=75°, then α=(75−67.5)/(90−67.5)=0.33. That is, α can be determined as (x−m)/(n−m) where m<x<n.

<3-2. Edge Direction Determination>
(a) Edge Strength Calculation Process

To select one of these multiple edge-preserving smoothing filters, the image processing unit 20 has to determine the direction of the edge component in the specific area 100. For example, the image processing unit 20 may determine the direction of the edge component by performing filtering using a Sobel filter. FIG. 15 includes schematic diagrams each showing an example of a Sobel filter for determining the direction. The image processing unit 20 determines which of the four directions, that is, the horizontal direction (0°), a diagonal direction of 45°, the vertically direction (90°), and a diagonal direction of 135° represents the direction of the edge component, by using four Sobel filters shown in FIGS. 15A to 15D corresponding to the respective directions.

The Sobel filters shown in FIGS. 15A to 15D are 3×3 matrixes and are used to determine the strength of an edge component in a direction perpendicular to the arrangement direction of the elements whose value is set to 0. The image processing unit 20 calculates the strength of the edge component by filtering the 3×3 area centered on the target pixel in the specific area 100 using the Sobel filters shown in FIGS. 15A to 15D (Note that the calculated value having an absolute value closer to 0 indicates stronger edge-component strength.)

As described above, the image processing unit 20 uses, as edge-preserving smoothing filters, the four filters corresponding to 0°, 45°, 90°, and 135°, as well as the four filters corresponding to 22.5°, 67.5°, 112.5° and 157.5°. For this reason, the image processing unit 20 has to acquire the strengths of edge components in directions of 22.5°, 67.5°, 112.5°, and 157.5°. By using one of two methods described below (or using a combination thereof), the image processing unit 20 calculates or estimates the strengths of the edge components in the directions of 22.5°, 67.5°, 112.5°, and 157.5°.

A first method for acquiring the strength of an edge component includes previously storing four basic Sobel filters corresponding to 0°, 45°, 90°, and 135°, as well as four expanded Sobel filters corresponding to 22.5°, 67.5°, 112.5°, and 157.5° and calculating the strengths of the edge components using the eight Sobel filters.

An expanded Sobel filter X corresponding to any angle x [rad] can be calculated using Formulas (1) to (4) below. Note that 0<x<π. In those formulas, A represents a basic Sobel filter corresponding to an angle 0 (0°), B represents a basic Sobel filter corresponding to an angle) π/4(45°), C represents a basic Sobel filter corresponding to an angle π/2 (90°), and D represents a basic Sobel filter corresponding to an angle 3π/4) (135°. A Sobel filter corresponding to an angle π (180°) can be obtained by inverting the sign of the basic Sobel filter corresponding to the angle 0 and therefore is represented by E(=−A).

If 0<x<π/4, then $X=\alpha A+(1-\alpha)B$ (1)

If π/4<x<π/2, then $X=\alpha B+(1-\alpha)C$ (2)

If π/2<x<3π/4, then $X=\alpha C+(1-\alpha)D$ (3)

If 3π/4<x<π, then $X=\alpha D+(1-\alpha)E$ (4)

In the above formulas, α represents an coefficient depending on the angle x and being more than 0 and less than 1. For example, if x=π/8, then α=1/2. For example, if x=π/6, then α=2/3. That is, when 0<x<π/4, the coefficient α can be determined based on the ratio between the difference between the angle x of the Sobel filter X to be calculated and the angle 0 and the difference between the angle x and π/4. The same applies to the other angle ranges. When m<x<n, a can be determined as (x−m)/(n−m).

Further, based on Formulas (1) to (4) above, a 3×3 Sobel filter for calculating the strength of an edge component in a direction of any angle x [rad] can be generated using Formulas (5) to (8) below. Note that 0≤x<π.

(a) When $0 \leq x < \frac{\pi}{4}$ $$\begin{bmatrix} -\alpha & \delta & \gamma \\ -\beta & 0 & \beta \\ -\gamma & -\delta & \alpha \end{bmatrix} \text{ where } \alpha = 1 - \frac{4x}{\pi}, \quad (5)$$

$\beta = 2 - \frac{4x}{\pi}, \gamma = 1 + \frac{4x}{\pi}, \text{ and } \delta = \frac{4x}{\pi}$ (b) When $\frac{\pi}{4} \leq x < \frac{\pi}{2}$ $$\begin{bmatrix} \delta & \gamma & \beta \\ -\alpha & 0 & \alpha \\ -\beta & -\gamma & -\delta \end{bmatrix} \text{ where } \alpha = 2 - \frac{4x}{\pi}, \quad (6)$$

$\beta = 3 - \frac{4x}{\pi}, \gamma = \frac{4x}{\pi}, \text{ and } \delta = \frac{4x}{\pi} - 1$ (c) When $\frac{\pi}{2} \leq x < \frac{3\pi}{4}$ $$\begin{bmatrix} \gamma & \beta & \alpha \\ \delta & 0 & -\delta \\ -\alpha & -\beta & -\gamma \end{bmatrix} \text{ where } \alpha = 3 - \frac{4x}{\pi}, \quad (7)$$

$\beta = 4 - \frac{4x}{\pi}, \gamma = \frac{4x}{\pi} - 1, \text{ and } \delta = \frac{4x}{\pi} - 2$ (d) When $\frac{3\pi}{4} \leq x < \pi$ $$\begin{bmatrix} \beta & \alpha & -\delta \\ \gamma & 0 & -\gamma \\ \delta & -\alpha & -\beta \end{bmatrix} \text{ where } \alpha = 4 - \frac{4x}{\pi}, \quad (8)$$

$\beta = 5 - \frac{4x}{\pi}, \gamma = \frac{4x}{\pi} - 2, \text{ and } \delta = \frac{4x}{\pi} - 3$ Use of Formulas (5) to (8) above allows for generation of expanded Sobel filters corresponding to 22.5°, 67.5°, 112.5°, and 157.5°. Use of Formulas (5) to (8) above also allows for generation of the basic Sobel filters shown in FIGS. 15A to 15D.

For a Sobel filter corresponding to the diagonal direction of 22.5° (x=π/8), for example, α=1/2, β=3/2, γ=3/2, and δ=1/2 are obtained from a matrix (a) in Formula (5) above. A comparison between the Sobel filter corresponding to 0° shown in FIG. 15A and the Sobel filter corresponding to 45° shown in FIG. 15C reveals that the values in the Sobel filter corresponding to 45° are values obtained by rotating the values in the Sobel filter corresponding to 0° by 45° degrees. Similarly, the values in the Sobel filter corresponding to 22.5° calculated using the above formula are values obtained by rotating the values in the Sobel filter corresponding to 0° by 22.5° degrees. Further, each value in the Sobel filter corresponding to 22.5° is the average value of the corresponding values in the Sobel filters corresponding to 0° and 45°.

According to the first method for acquiring the strength of an edge component, the image processing unit 20 previously stores the four basic Sobel filters and four expanded Sobel filters and then calculates the edge strengths using the eight Sobel filters. Thus, the image processing unit 20 can calculate the strengths of the edge components in the eight directions and can select one of the edge-preserving smoothing filters shown in FIGS. 12 and 13 on the basis of the calculated strengths. As seen above, the image processing unit 20 may store the Sobel filters corresponding to the angles to which the stored edge-preserving smoothing filters correspond. (In this case, the image processing unit 20 can determine which of the smoothing filters should be used, on the basis of the strengths of the edge components calculated using the respective Sobel filters and therefore does not have to perform the (b) edge strength estimation process described below.)

On the other hand, according to a second method for acquiring the strength of an edge component, the image processing unit 20 stores the four Sobel filters shown in FIGS. 15A to 15D but does not have to store the Sobel filters corresponding to the diagonal directions of 22.5°, 67.5°, 112.5°, and 157.5°. In this method, the image processing unit 20 calculates the strengths of edge components in directions of angles with respect to which the image processing unit 20 does not store corresponding Sobel filters, in the (b) edge strength estimation process described below.

(b) Edge Strength Estimation Process

If the number of stored Sobel filters is smaller than the number of stored edge-preserving smoothing filters, the image processing unit 20 estimates the strengths of edge components in directions with respect to which the image processing unit 20 cannot calculate using the stored Sobel filters. The image processing unit 20 estimates the strengths of the edge components in such directions on the basis of the strengths of the multiple edge components calculated in the (a) edge strength calculation process.

Figure 16:
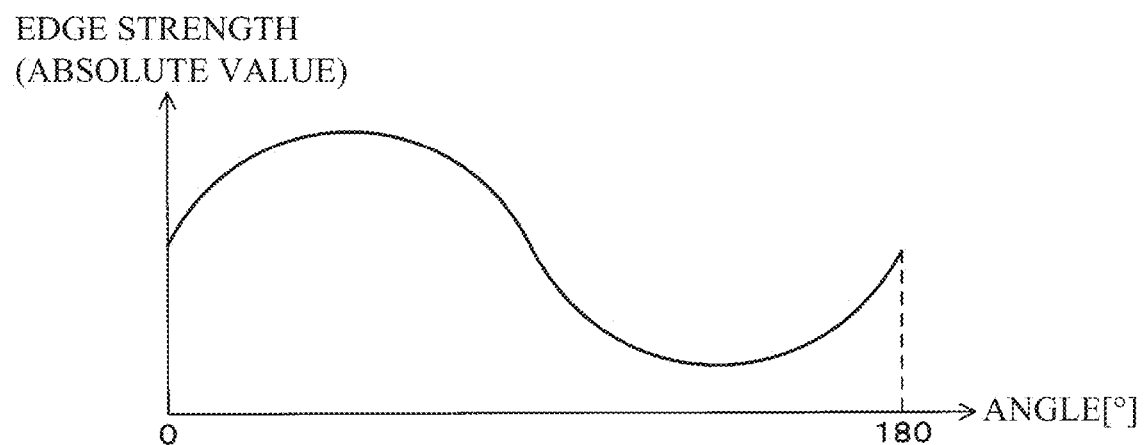
FIG. 16 is a graph showing an example of the correspondence between the value calculated by the Sobel filter and the angle.

FIG. 16 is a graph showing an example of the correspondence between the value (absolute value) calculated by the Sobel filter and the angle. In the graph shown in FIG. 16, the lateral axis represents the angle [°], and the longitudinal axis represents the absolute value of the strength of the edge component calculated by the Sobel filter. As shown in FIG. 16, if the edge component depends on the direction, the absolute value of the strength calculated using the Sobel filter varies in a manner having maximum and minimum values. The image processing unit 20 of the display device 1 of the present embodiment performs interpolation on the basis of the strengths of the edge components in the four directions of 0°, 45°, 90°, and 135° calculated by the four Sobel filters shown in FIG. 15. Thus, the image processing unit 20 estimates the strengths of the edge components in the other directions.

Figure 17:
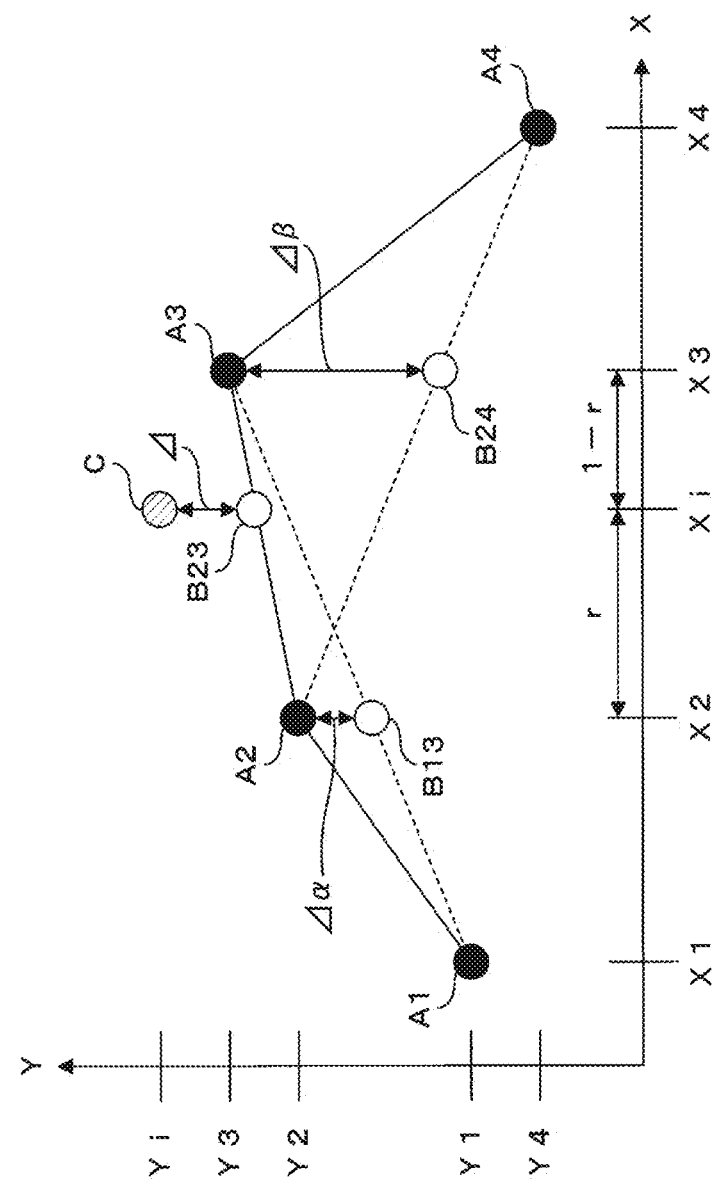
FIG. 17 is a schematic diagram showing an interpolation process for estimating the strength.

FIG. 17 is a schematic diagram showing the interpolation process for estimating the strengths. Points shown by black circles in FIG. 17 represent the strengths calculated in the filtering processes using the Sobel filters. Specifically, the points consist of four points: A1 (X1,Y1), A2 (X2,Y2), A3 (X3,Y3), and A4 (X4,Y4). A point C (Xi,Yi) shown by a hatched circle in FIG. 17 is a point indicating the strength estimated based on A1 to A4 and lies between the points A2 and A3. It is assumed that the ratio between the distance from the coordinate X2 to a coordinate Xi and the distance from the coordinate Xi to the coordinate X3 is r:1−r (0<r<1).

A point B13 shown by a white circle in FIG. 17 is a point having the coordinate X2 linearly interpolated between the points A1 and A3. Similarly, a point B24 is a point having the coordinate X3 linearly interpolated between the points A2 and A4. A point B23 is a point having the coordinate Xi linearly interpolated between the points A2 and A3. The distance between the points A2 and B13 (the difference in Y coordinate between both points) is defined as Δα, and the distance between the points A3 and B24 is defined as Δβ. Similarly, the distance between the points B23 and C is defined as Δ.

Based on these, an estimated coordinate Yi of the point C can be represented by Formula (11) below.

$$Yi=(1-r)\times Y2+r\times Y3+\Delta \tag{11}$$

Further, Δ in Formula (11) above can be represented by Formula (12) below.

$$\Delta=(1-r)\times\Delta\alpha+r\times\Delta\beta \tag{12}$$

Further, Δα and Δβ can be represented by Formulas (13) and (14) below, respectively.

$$\Delta\alpha=Y2-(Y1+Y3)/2 \tag{13}$$

$$\Delta\beta=Y3-(Y2+Y4)/2 \tag{14}$$

Specifically, the point C to be calculated is a point obtained by adding, to the point (point B23) linearly interpolated between the adjacent points (points A2 and A3), an average value (Δ) calculated by weighting the respective errors (Δα and Δβ) of the points (point B13 and point B24) each interpolated between adjacent two points using the distant two points (points A1 and A4).

Formulas (11) to (14) above are applied to the strengths of the edge components calculated using the Sobel filters. The strengths (absolute values) of the edge components calculated using the smoothing filters corresponding to 0°, 45°, 90°, and 135° shown in FIG. 15 are represented by a, b, c, and d, respectively, and the estimated strength (absolute value) of the edge component corresponding to 22.5° is represented by e. Since the absolute value of the strength is used in the present embodiment, the strength of the edge component corresponding to 135° can be regarded as the strength corresponding to −45°.

Accordingly, the points A1 to A4 shown in FIG. 17 have the following coordinates.
A1 (135°,d)
A2 (0°,a)
A3 (45°,b)
A4 (90°,c)
C (22.5°,e)
In this case, r=1/2.

By substituting these values into Formulas (11) to (14), Formula (21) below is obtained.

$$e=\{3\times(a+b)-(c+d)\}/4 \tag{21}$$

Similarly, Formulas (22) to (24) below are obtained.

$$f=\{3\times(b+c)-(d+a)\}/4 \tag{22}$$

$$g=\{3\times(c+d)-(a+b)\}/4 \tag{23}$$

$$h=\{3\times(d+a)-(b+c)\}/4 \tag{24}$$

In these formulas, f represents the strength of the edge component corresponding to 67.5°; g represents the strength of the edge component corresponding to 112.5°; and h represents the strength of the edge component corresponding to 157.5°.

Accordingly, the image processing unit 20 can estimate the strengths e to h of the edge components in the other directions which cannot be calculated using the Sobel filters, on the basis of the strengths a to d of the edge components calculated using the four Sobel filters shown in FIG. 15 and Formulas (21) to (24) above.

(c) Edge Direction Determination Process

The image processing unit 20 calculates the strengths of the edge components in the eight directions using the four basic Sobel filters and the four expanded Sobel filters (first method). Alternatively, the image processing unit 20 calculates the strengths of the edge components in the respective directions using the four Sobel filters of FIGS. 15A to 15D, as well as estimates the strengths of the edge components in the other directions (second method). The image processing unit 20 makes comparison among the calculated or estimated strengths of the multiple edge components and determines a direction having the highest strength (having the smallest of the absolute values of the calculated values), as the direction of the edge component in the specific area 100. The image processing unit 20 then reads an edge-preserving smoothing filter corresponding to the determined direction (see FIGS. 12 and 13) and filters the specific area 100 using the read edge-preserving smoothing filter to smooth the pixel of the target pixel.

Figure 18:
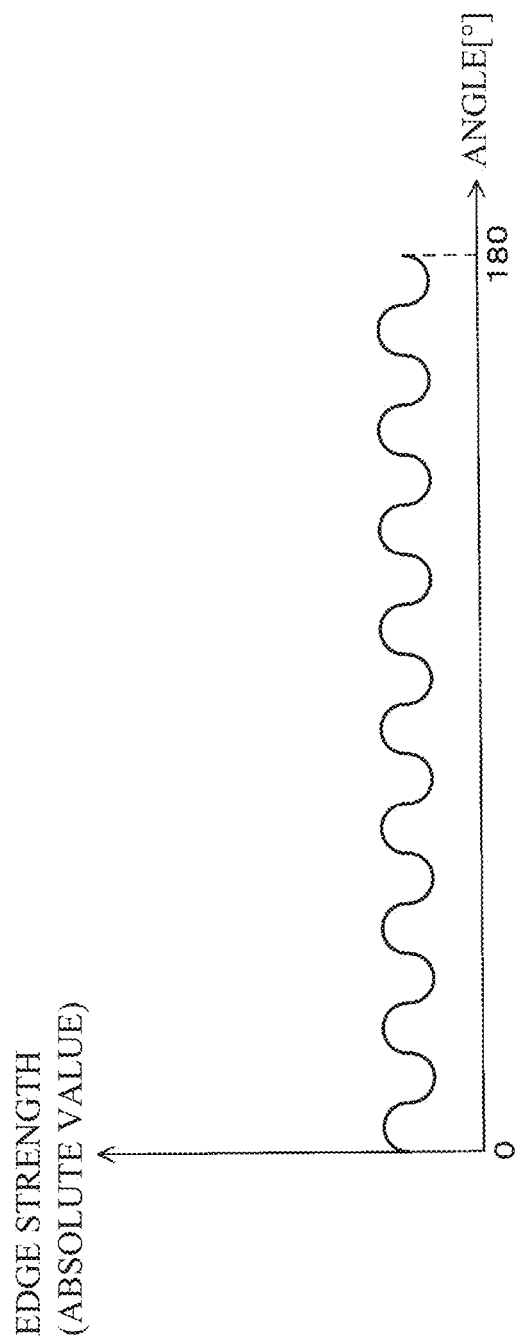
FIG. 18 is a graph showing an example of the correspondence between the value calculated by the Sobel filter and the angle.

However, for example, if the specific area 100 is an image including one dot-texture, one dot-width thin line, or the like, it is difficult to calculate the strengths of the edge components using the Sobel filters and to determine the direction of the edge component on the basis of the calculated strengths. FIG. 18 is a graph showing an example of the correspondence between the strength (absolute value) calculated by the Sobel filter and the angle. In the graph shown in FIG. 18, the lateral axis represents the angle [°], and the longitudinal axis represents the absolute value of the strength of the edge component calculated by the Sobel filter. An example shown in FIG. 18 shows the result of an operation performed on an image including one dot-texture, one dot-width thin line, or the like using a Sobel filter As shown in FIG. 18, if the specific area 100 is an image including one dot-texture, one dot width thin line, or the like, the strength of the edge component calculated using the Sobel filter varies with the angle to a lesser extent. For this reason, the image processing unit 20 selects the largest and smallest of the absolute values of the calculated strengths of the edge components and the absolute values of the strengths of the edge components estimated from these absolute values and calculates the difference therebetween. If the calculated difference does not exceed a threshold, the image processing unit 20 regards the specific area 100 as an image having no direction and smoothes the specific area 100 using the isotropic smoothing filter shown in FIG. 14.

Figure 19:
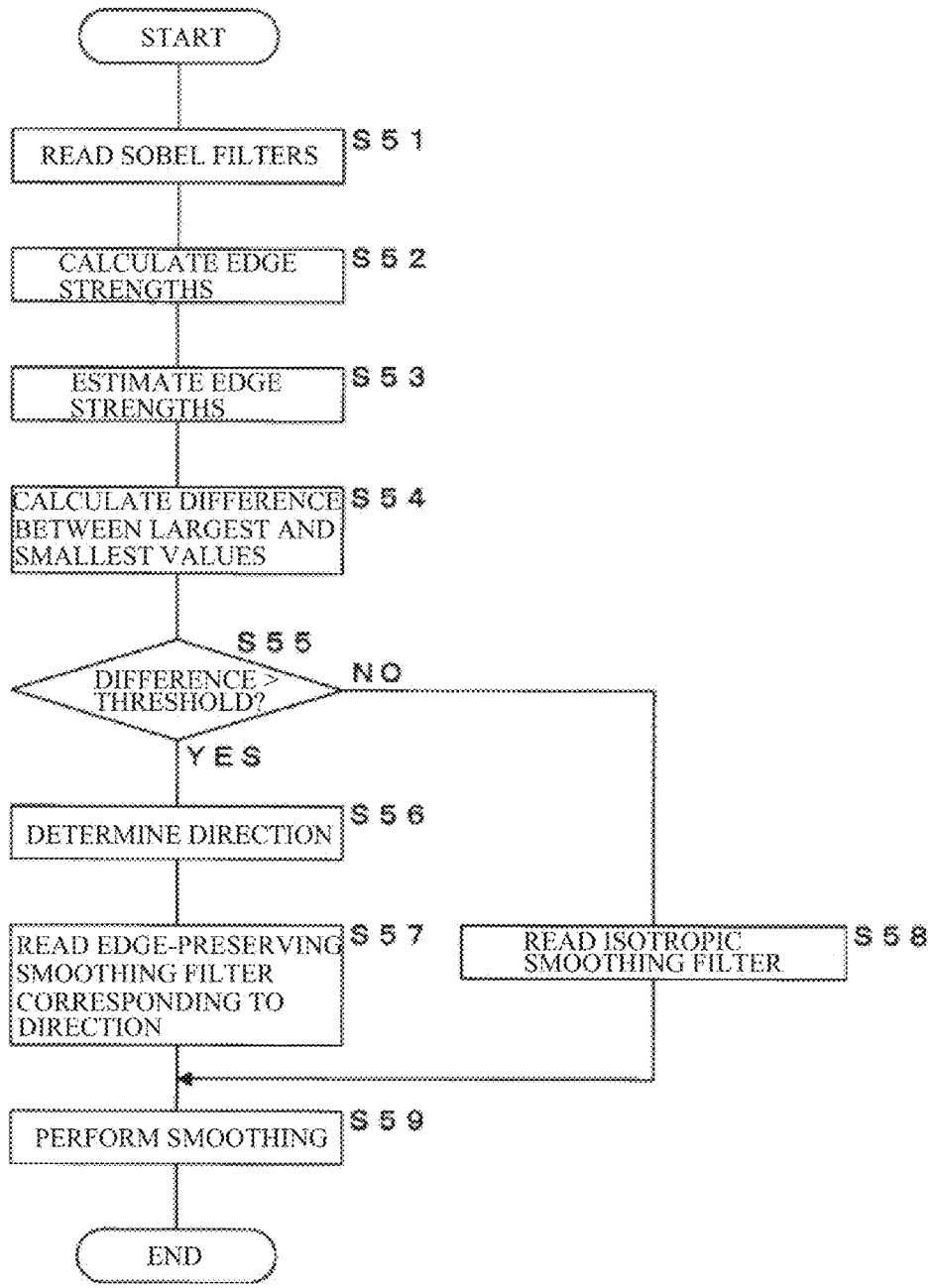
FIG. 19 is a flowchart showing the steps of an edge-preserving smoothing process.

FIG. 19 is a flowchart showing the steps of the edge-preserving smoothing process performed in step S7 of FIG. 3. In the edge-preserving smoothing process, first, the image processing unit 20 reads the multiple Sobel filters previously stored in memory or the like (step S51). The image processing unit 20 then filters the specific area 100 using the Sobel filters to calculate the strengths of the edge components in the respective directions (step S52).

The image processing unit 20 then estimates the strengths of the edge components in the other directions on the basis of the calculated strengths of the multiple edge components (step S53). The image processing unit 20 then calculates the difference between the largest and smallest of the absolute values of the strengths calculated in step S52 and the absolute values of the strengths estimated in step S53 (step S54). It then determines whether the calculated difference exceeds the threshold (step S55).

If the difference exceeds the threshold (S55: YES), the image processing unit 20 determines the largest (the smallest absolute value) of the strengths calculated in step S52 and the strengths estimated in step S53 to determine the direction of the edge component in the specific area 100 (step S56). The image processing unit 20 then reads an edge-preserving smoothing filter corresponding to the determined direction of the edge component (step S57).

If the difference does not exceed the threshold (S55: NO), the image processing unit 20 determines that the edge component in the specific area 100 has no direction and reads an isotropic smoothing filter rather than an edge-preserving smoothing filter (step S58).

The image processing unit 20 then filters the specific area 100 using the smoothing filter read in step S57 or S58 to smooth the target pixel (step S59), ending the process.

<4. Application Determination>

As described above, if the image processing unit 20 determines in the smoothing determination process that a smoothing process is not to be performed, it performs a smoothing process using an edge-preserving smoothing filter. Typically, an edge-preserving smoothing filter is used to filter an area including a high-frequency component to some extent. However, for example, if an image including a clear edge, pattern, or the like is filtered using an edge-preserving smoothing filter, the image quality may be degraded. For this reason, the image processing unit 20 determines whether to apply the result of the smoothing process using the edge-preserving smoothing filter, on the basis of one or more criteria. Hereafter, three example determination criteria will be described.

(1) Edge Amount Determination

For example, the image processing unit 20 calculates the amount (strength) of the edge component in the specific area 100, and if the calculated amount of the edge is smaller than a threshold, it determines that the result of the smoothing process using the edge-preserving smoothing filter is to be applied. Accordingly, if the amount of the edge is greater than the threshold, smoothing is not performed. Thus, degradation of the image quality due to smoothing of an image including a clear edge, pattern, or the like is prevented. The amount of the edge in the specific area 100 can be calculated using, for example, a Laplacian filter.

Figure 20:
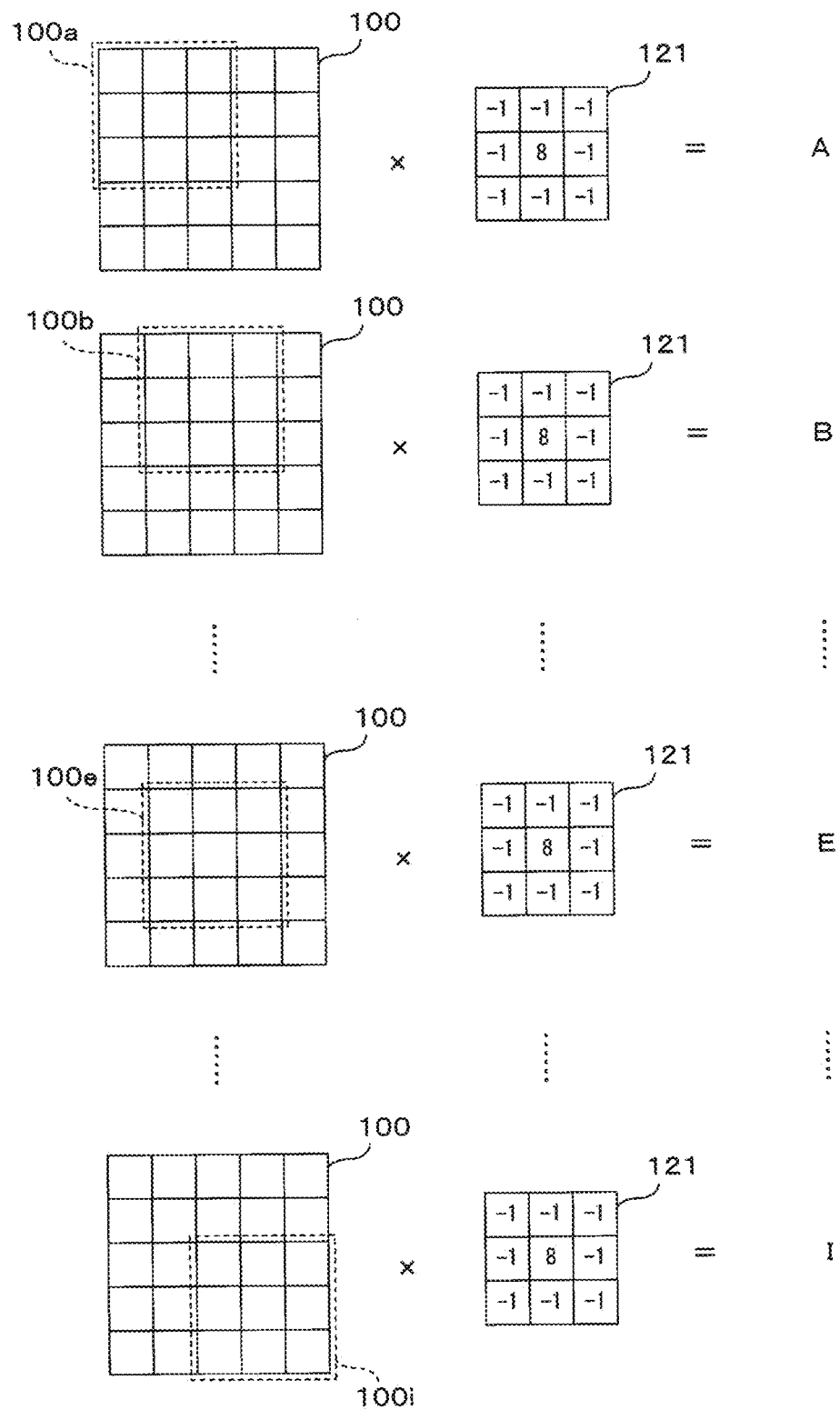
FIG. 20 is a schematic diagram showing the determination of the amount of the edge using a Laplacian filter.

FIG. 20 is a schematic diagram showing the determination of the amount of the edge using a Laplacian filter. The image processing unit 20 performs an edge amount determination process using a previously stored Laplacian filter 121. In an example shown in FIG. 20, the Laplacian filter 121 is a 3×3 matrix, the center value is set to 8, and all the values adjacent thereto are set to −1.

The image processing unit 20 extracts 3×3 subareas 100$a$ to 100$i$ from the specific area 100, which is a 5×5 matrix. The 3×3 subareas 100$a$ to 100$i$ can be extracted from the 5×5 matrix in nine ways. The image processing unit 20 then filters the extracted subareas 100$a$ to 100$i$ using the Laplacian filter 121, thereby calculating nine values A to I as the process results. The image processing unit 20 then calculates the sum of the absolute values of the values A to I as an evaluation value S (that is, S=|A|+|B|+ . . . +|I|).

The evaluation value S calculated represents the amount of the edge component in the specific area 100. The image processing unit 20 then determines whether the evaluation value S exceeds a threshold. If the evaluation value S does not exceed the threshold, the image processing unit 20 determines that the result of the smoothing process using the edge-preserving smoothing filter is to be applied. In contrast, if the evaluation value S exceeds the threshold, the image processing unit 20 determines that the result of the smoothing process using the edge-preserving smoothing filter is not to be applied.

(2) Texture Determination

When a pixel-based, fine texture image or the like is smoothed, the texture may collapse, resulting in degradation of the image quality. For this reason, the image processing unit 20 may be configured as follows: it determines whether the image is a texture image, on the basis of the pixel value change characteristics or the like of the specific area 100; if the image is not a texture image, it determines that the result of the smoothing process is to be applied; and if the image is a texture image, it determines that the result of the smoothing process is not to be applied.

For example, the image processing unit 20 calculates the vibration frequency of the pixels (the increase/decrease frequency of the pixel values) in the specific area 100 and determines whether to apply the result of the smoothing process using the edge-preserving smoothing filter, on the basis of the vibration frequency. FIGS. 21 and 22 include schematic diagrams showing an application determination based on the vibration frequency. As shown in FIGS. 21A to 22D, the image processing unit 20 calculates the vibration frequencies with respect to four directions in the specific area 100, that is, the horizontal direction, the vertical direction, the diagonal direction of 45°, and the diagonal direction of 135°.

As shown in FIG. 21A, the image processing unit 20 calculates the differences between the values of the horizontally adjacent pixels in the 5×5 specific area 100 and generates a 4×5 matrix consisting of the calculated differences. At this time, the image processing unit 20 sets, to 0, the matrix values corresponding to the differences smaller than or equal to a threshold.

The image processing unit 20 then checks the signs (positive, negative, or 0) of the horizontally adjacent values in the 4×5 matrix and assigns points to the sets of adjacent values. Specifically, if a set of adjacent values have different signs or if one value of a set of adjacent values is 0 and the other value is not 0, the image processing unit 20 assigns one point to this set. The image processing unit 20 assigns points to all the sets of the horizontally adjacent values in the 4×5 matrix in this manner, that is, it assigns points to 3×5=15 sets of horizontally adjacent values. The image processing unit 20 then calculates the sum of the points assigned to the 15 sets and defines the triple of the sum as the horizontal vibration frequency A. The reason why the sum is tripled and the resulting value is defined as the vibration frequency A is that the number of sets which are assigned points in the operations with respect to the diagonal directions of 45° and 135° (to be discussed later) is as small as nine and therefore the sum is weighted based on the number of sets to normalize the vibration frequency.

Similarly, as shown in FIG. 21B, the image processing unit 20 generates a 5×4 matrix consisting of the differences between the values of the vertically adjacent pixels in the specific area 100 (sets, to 0, the matrix values corresponding to the differences smaller than or equal to a threshold). The image processing unit 20 assigns points to 5×3=15 sets of the vertically adjacent values in the 5×4 matrix on the basis of the signs of the vertically adjacent values. The image processing unit 20 then calculates the sum of the points assigned to the 15 sets and defines the triple of the sum as the vertical vibration frequency B.

As shown in FIG. 22C, the image processing unit 20 generates a 4×4 matrix consisting of the differences between the values of the adjacent pixels in the diagonal direction of 45° in the specific area 100 (sets, to 0, the matrix values corresponding to the differences smaller than or equal to a threshold). The image processing unit 20 assigns points to 3×3=9 sets of the adjacent values in the diagonal direction of 45° in the 4×4 matrix on the basis of the signs of the adjacent values. The image processing unit 20 then calculates the sum of the points assigned to the 9 sets and defines the quintuple of the sum as the 45° diagonal vibration frequency C.

As shown in FIG. 22D, the image processing unit 20 generates a 4×4 matrix consisting of the differences between the values of the adjacent pixels in the diagonal direction of 135° in the specific area 100 (sets, to 0, the matrix values corresponding to the differences smaller than or equal to a threshold). The image processing unit 20 assigns points to the 3×3=9 sets of the adjacent values in the diagonal direction of 135° in the 4×4 matrix on the basis of the signs of the adjacent values. The image processing unit 20 then calculates the sum of the points assigned to the 9 sets and defines the quintuple of the sum as the 135° diagonal vibration frequency C.

The image processing unit 20 selects the lowest of the calculated four vibration frequencies A to D and determines whether the lowest frequency exceeds a threshold. If the lowest of the vibration frequencies A to D does not exceed the threshold, the image processing unit 20 determines that the result of the smoothing process using the edge-preserving smoothing filter is to be applied. In contrast, if the lowest of the vibration frequencies A to D exceeds the threshold, the image processing unit 20 determines that the result of the smoothing process using the edge-preserving smoothing filter is not to be applied.

(3) Pixel Value Variation Amount Determination

For example, the image processing unit 20 may be configured to determine whether to apply the result of the smoothing process using the edge-preserving smoothing filter, on the basis of the amount of variation of the value of the target pixel in such smoothing. Specifically, the image processing unit 20 calculates the difference between the yet-to-be-smoothed value of the target pixel (that is, the pixel value in the input image) and the smoothed value of the target pixel and, if this difference does not exceed a threshold, it determines that the result of such smoothing is to be applied; and if the difference exceeds the threshold, it determines that the result of such smoothing is not to be applied. Thus, a significant change in the value of the target pixel due to such smoothing process can be prevented.

The image processing unit 20 determines whether to apply the result of the smoothing process using the edge-preserving smoothing filter, on the basis of the above determinations (1) to (3). Specifically, if the image processing unit 20 determines in all the above determinations (1) to (3) that the result of the smoothing process using the edge-preserving smoothing filter is to be applied, it applies the result of such smoothing. If the image processing unit 20 determines in any of the criterion determinations (1) to (3) above that the result of the smoothing process using the edge-preserving smoothing filter is not to be applied, it does not apply the result of such smoothing. Alternatively, the image processing unit 20 may be configured to make not all but one or two of the above three determinations (1) to (3). The image processing unit 20 may also be configured to make an application determination on the basis of a different determination from the above determinations (1) to (3).

In the present embodiment, as an example, the image processing unit 20 is configured to perform a smoothing process using an edge-preserving smoothing filter and to subsequently determine whether to apply the result of such smoothing, as shown in the flowchart of FIG. 3, other configurations may be used. Instead of making a determination in which the result of the smoothing process is referred to, such as the determination (3), the image processing unit 20 may be configured to first make an application determination and to then perform a smoothing process using an edge-preserving smoothing filter on the basis of the application determination.

Figure 23:
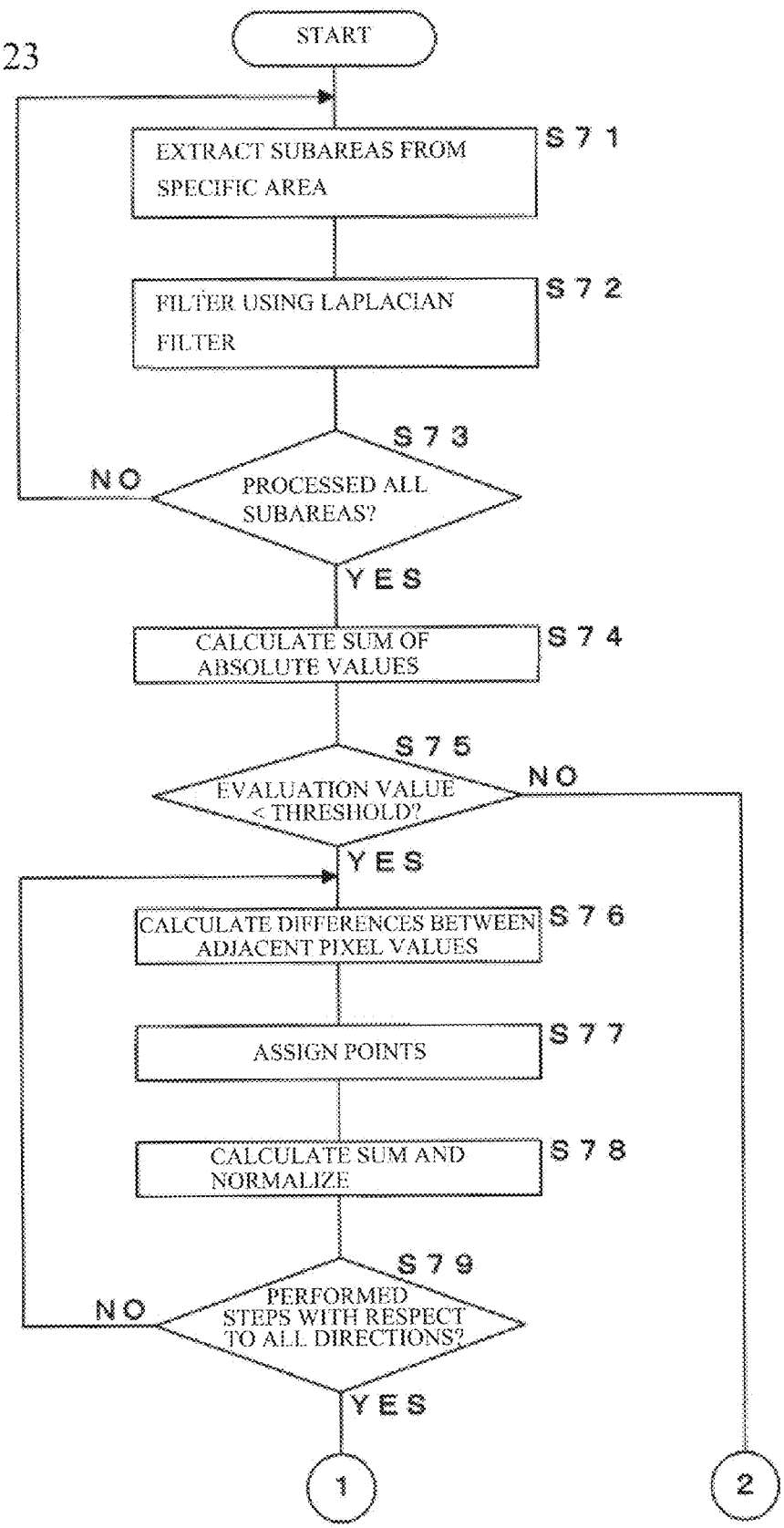
FIG. 23 is a flowchart showing the steps of an application determination process.
Figure 24:
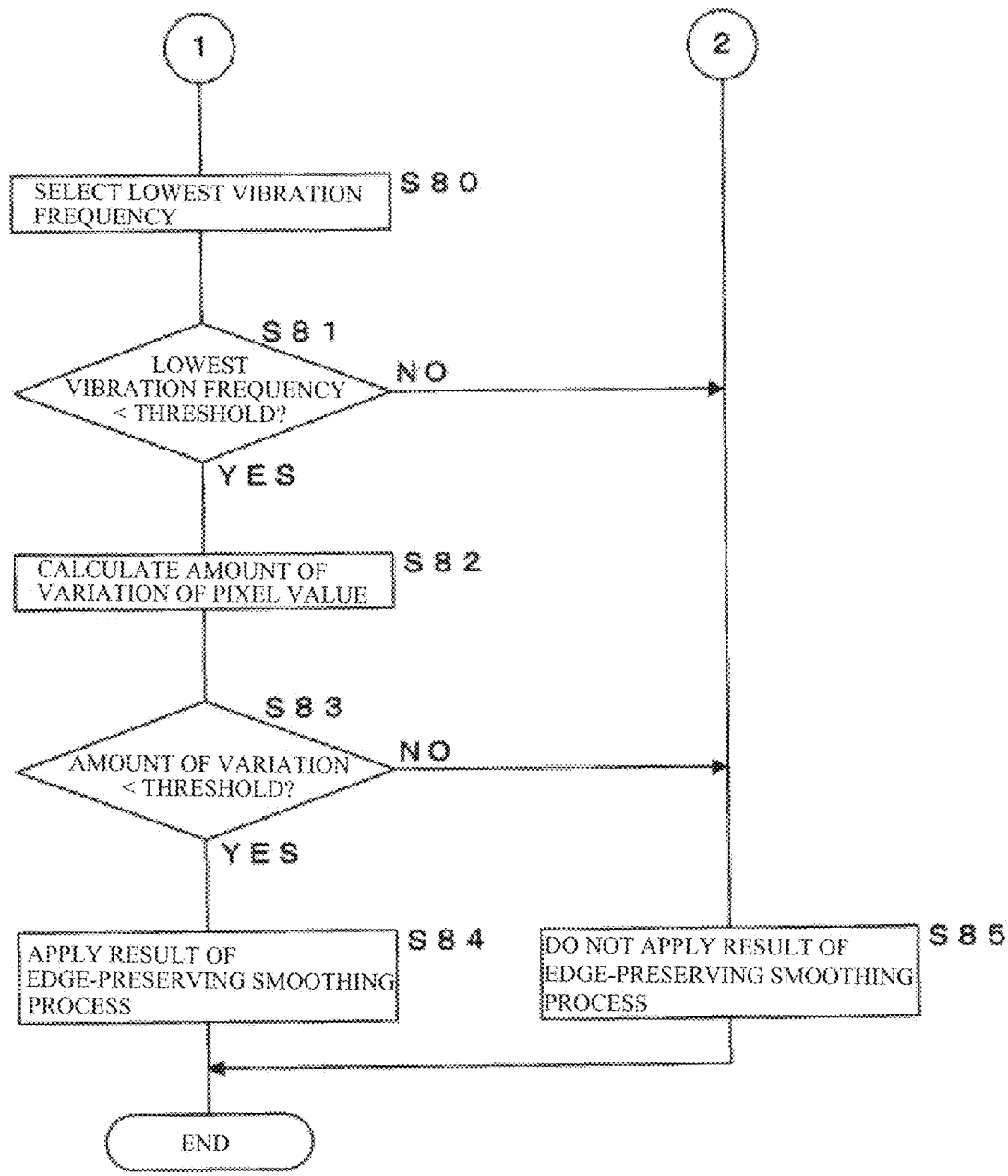
FIG. 24 is a flowchart showing the steps of an application determination process.

FIGS. 23 and 24 are flowcharts showing the steps of the application determination process performed in step S8 of FIG. 3. First, the image processing unit 20 determines the amount of the edge. The image processing unit 20 then extracts one of the 3×3 subareas 100a to 100i from the 5×5 specific area 100 (step S71) and filters the extracted subarea using the Laplacian filter 121 (step S72). The image processing unit 20 determines whether it has completed extraction of all the subareas 100a to 100i and filtering of the extracted subareas using the Laplacian filter 121 (step S73). If the image processing unit 20 has not performed these processes on all the subareas 100a to 100i (S73: NO), the image processing unit 20 returns to step S71 to extract the remaining subareas 100a to 100i and filter the extracted subareas using the Laplacian filter 121.

If the image processing unit 20 has completed extraction and filtering of all the subareas 100a to 100i (S73: YES), it calculates the sum of the absolute values of the multiple values calculated in the filtering processes (step S74) and defines the sum as the evaluation value S. The image processing unit 20 then determines whether the evaluation value S is smaller than the threshold (step S75). If the evaluation value S is greater than or equal to the threshold (S75: NO), the image processing unit 20 determines that the result of the edge-preserving smoothing process is not to be applied (step S85), ending the application determination process.

If the evaluation value S is smaller than the threshold (S75: YES), the image processing unit 20 makes a texture determination. The image processing unit 20 then calculates the differences between the values of the adjacent pixels in one direction in the specific area 100 (step S76). The image processing unit 20 then assigns points to a matrix consisting of the calculated differences on the basis of the signs of the adjacent differences in the one direction (step S77). The image processing unit 20 then calculates the sum of the assigned points, as well as multiplies the calculated sum by a predetermined factor for normalization (step S78) and defines the normalized value as the vibration frequency with respect to this direction. The image processing unit 20 then determines whether steps S76 to S78 have been performed with respect to all the directions (step S79). If not so determined (S79: NO), the image processing unit 20 returns to step S76 to perform these steps with respect to the remaining directions.

If steps S76 to S78 have been performed with respect to all the directions (S79: YES), the image processing unit 20 selects the lowest of the vibration frequencies calculated with respect to the respective directions (step S80) and determines whether the lowest vibration frequency is lower than the threshold (step S81). If the lowest vibration frequency is higher than or equal to the threshold (S81: NO), the image processing unit 20 determines that the result of the edge-preserving smoothing is not to be applied (step S85), ending the application determination process.

In contrast, if the lowest vibration frequency is lower than the threshold (S81: YES), the image processing unit 20 makes a determination as to the amount of variation of the pixel value. Specifically, the image processing unit 20 calculates the amount of variation (difference) of the value of the target pixel before and after the smoothing process using the edge-preserving smoothing filter (step S82) and determines whether the calculated amount of variation is smaller than a threshold (step S83). If so determined (S83: YES), the image processing unit 20 determines that the result of the edge-preserving smoothing is to be applied (step S84), ending the application determination process. In contrast, if not so determined (S83: NO), the image processing unit 20 determines that the result of the edge-preserving smoothing is not to be applied (step S85), ending the application determination process.

As seen above, the display device 1 of the present embodiment extracts the specific area 100 including the target pixel from the input image and determines whether to smooth the target pixel in the specific area 100. If so determined, the display device 1 filters the target pixel using a smoothing filter to smooth it. If not so determined, the display device 1 filters the target pixel using an edge-preserving smoothing filter to smooth it. At this time, the display device 1 determines whether to apply the result of the smoothing process using the edge-preserving smoothing filter, on the basis of the pixel values in the specific area 100, the result of such smoothing, and the like. Thus, the display device 1 can output, as the value of the target pixel in the input image, one of the pixel value smoothed using the smoothing filter, the pixel value smoothed using the edge-preserving smoothing filter, and the yet-to-be-smoothed pixel value. The display device 1 can generate and display an output image in which each pixel has been smoothed in a manner suitable for the pixel, by performing the above process with respect to all the pixels in the input image.

The display device 1 also calculates the differentials between the values of the pixels in the specific area 100 and determines whether to smooth the target pixel in the specific area 100, on the basis of the calculated differentials. If so determined, the display device 1 determines the direction and position of the noise boundary in the specific area 100. Thus, the display device 1 can smooth the target pixel in a manner suitable for the direction and position of the noise boundary in the specific area 100 to accurately eliminate or reduce the noise in the input image.

If the direction of the noise boundary in the specific area 100 is not any of the horizontal pattern, the vertical pattern, and the other patterns (that is, if there is no noise boundary in the specific area 100), the display device 1 expands the size of the specific area 100 and then makes the above determination. It repeats this process until it detects a noise boundary in one of the above patterns or until the specific area 100 becomes the predetermined size. Thus, the display device 1 can accurately detect block noises having various sizes and eliminate or reduce them.

The display device 1 also calculates the first- and second-order differentials between the values of the adjacent pixels in the specific area 100 to determine whether to smooth the target pixel in the specific area 100. At this time, the display device 1 compares the first-order differentials with the threshold to generate a matrix in which the first-order differentials are binarized and then performs an OR operation on each row or column in this matrix. It also compares the second-order differentials with the threshold to generate a matrix in which the second-order differentials are binarized and then performs an OR operation on each row or column in this matrix. The display device 1 further performs an OR operation on the OR result with respect to the first-order differentials and the OR result with respect to the second-order differentials and then determines whether to perform a smoothing process on the basis of the operation result. Thus, the display device 1 can accurately determines whether to smooth the target pixel in the specific area 100.

The display device 1 also performs calculation of differentials and OR operations with respect to the longitudinal and transverse directions of the specific area 100 and determines whether the noise boundary extends longitudinally or transversely, on the basis of the OR results with respect to the respective directions. The display device 1 also determines the position of the noise boundary in the specific area 100 on the basis of the 0/1 array pattern of the second-order differential matrix. Thus, the display device 1 can easily determine whether the noise boundary in the specific area 100 extends longitudinally or transversely (vertically or horizontally), as well as can easily determine the position of the noise boundary in the specific area 100.

The display device 1 also stores the multiple smoothing filters for eliminating or reducing noise, selects among the smoothing filters on the basis of the determined direction and/or position of the noise boundary, and smoothes the value of the target pixel in the specific area 100 using the selected smoothing filter. Thus, the display device 1 can smooth the target pixel in a manner suitable for the direction and position of the noise boundary in the specific area 100.

The display device 1 also calculates the strengths of the edge components in the multiple directions in the specific area 100 using the multiple Sobel filters, as well as estimates the strengths of the edge components in the other directions on the basis of the calculated strengths. The display device 1 then determines the extending direction of the edge component in the specific area 100 on the basis of the calculated and estimated strengths of the edge components and performs a smoothing process using an edge-preserving smoothing filter corresponding to the determined direction. As seen above, the display device 1 can estimate the strengths of the edge components in the directions with respect to which it cannot calculate the strengths using the stored Sobel filters and thus can determine the direction of the edge component with respect to more directions. Thus, the display device 1 can select an edge-preserving smoothing filter more suitable for the edge component in the specific area 100 and can accurately perform smoothing.

More specifically, the display device 1 calculates the strengths of the edge components in at least four directions (0°, 45°, 90°, and 135°) using the Sobel filters and estimates the strengths of the edge components in the other directions (22.5°, 67.5°, 112.5°, and 157.5° on the basis of the calculated four strengths. In this case, the display device 1, which stores Formulas (21) to (24) for estimating the strength of the edge component by linear interpolation, can calculate estimated strengths in the other directions by substituting the four strengths calculated using the Sobel filters into these Formulas.

The display device 1 may store four basic Sobel filters corresponding to 0°, 45°, 90°, and 135°, as well as four expanded Sobel filters corresponding to 22.5°, 67.5°, 112.5°, and 157.5° and then calculate the strengths in the eight directions using the eight Sobel filters. The four expanded Sobel filters can be previously calculated using Formulas (1) to (4) or Formulas (5) to (8). Thus, the display device 1 can select an edge-preserving smoothing filter more suitable for the edge component in the specific area 100 to accurately perform smoothing.

The display device 1 also selects the highest and lowest of the calculated and estimated multiple edge strengths and then determines whether the difference therebetween exceeds the threshold. If the difference does not exceed the threshold, the display device 1 regards the specific area 100 as an approximately flat image including no edge component and smoothes the specific area 100 using an isotropic smoothing filter, which is not of edge-preserving type. As seen above, the display device 1 can properly smooth the image including no edge component.

The display device 1 also calculates the strength of the edge component in the specific area 100 using the Laplacian filter and then determines whether the calculated strength exceeds the threshold. If the calculated strength does not exceed the threshold, the display device 1 does not apply the result of the smoothing process using the edge-preserving smoothing filter. Thus, for example, if the input image includes a clear edge, pattern, or the like, degradation of the image quality due to a smoothing process can be prevented.

The display device 1 also calculates the increase/reduction frequency, that is, the vibration frequency of the values of the adjacent pixels in the specific area 100 and then determines whether the calculated vibration frequency exceeds the threshold. If the calculated vibration frequency exceeds the threshold, the display device 1 does not apply the result of the smoothing process using the edge-preserving smoothing filter. Thus, for example, if the input image includes fine texture such as pixel-based texture, degradation of the image quality due to a smoothing process, such as ambiguity of the texture, can be prevented.

The display device 1 also calculates the amount of variation of the value of the target pixel between before and after the smoothing process using the edge-preserving smoothing filter and determines whether the calculated amount of variation exceeds the threshold. If the amount of variation exceeds the threshold, the display device 1 does not apply the result of the smoothing process using the edge-preserving smoothing filter. Thus, when whether the target pixel is texture or noise is difficult to determine, for example, when only the target pixel has a significantly different value from those of the other pixels in the specific area 100, the effect of the smoothing can be reduced.

While, in the present embodiment, the display device 1 is configured to, when it determines that the target pixel in the specific area 100 is not to be smoothed, smooth the target pixel using an edge-preserving smoothing filter, other configurations may be used. For example, the display device 1 may be configured not to smooth the target pixel using an edge-preserving smoothing filter. While the display device 1 is configured to extract a 5×5-pixel area as the specific area 100, other configurations may be used. For example, it may extract an area having another size, such as 3×3 pixels or 7×7 pixels, as the specific area 100. Further, the smoothing filters shown in FIGS. 10 and 11 are only illustrative. The edge-preserving smoothing filters shown in FIGS. 12 and 13 are also only illustrative. The isotropic smoothing filter shown in FIG. 14 is also only illustrative. The Sobel filters shown in FIG. 15 and the Laplacian filters shown in FIG. 20 are also only illustrative.

While the display device 1 is configured to calculate the strengths of the edge components in the directions of 0°, 45°, 90°, and 135° using Sobel filters and to calculate or estimate the strengths of the edge components in the directions of 22.5°, 67.5°, 112.5°, and 157.5°, these directions (angles) are only illustrative. The display device 1 may be configured to use the first method, which includes previously storing eight Sobel filters and calculating the strengths of the edge components in the eight directions or may be configured to use the second method, which includes previously storing four Sobel filters and estimating the strengths of the edge components in the other four directions. The display device 1 may also be configured to use a combination of the first and second methods. As an example, the display device 1 may be configured to calculate the strengths of edge components in six directions using Sobel filters and to estimate the strengths of edge components in the remaining two directions. As another example, the display device 1 may be configured to calculate the strengths of edge components in eight directions using Sobel filters corresponding to the eight directions and to estimate the strengths of edge components in other eight directions, thereby obtaining the strengths of the edge components in the 16 directions.

While the display device 1 is configured to determine whether to apply the result of the smoothing process using the edge-preserving smoothing filter, on the basis of the three criteria: the edge amount determination, texture determination, and pixel value variation amount determination, other configurations may be used. For example, the display device 1 may make the application determination on the basis of one or two of the three determinations or may make the application determination on the basis of determinations other than the three determinations.

While the display device 1 is configured to perform one of the two types of smoothing processes, that is, the first smoothing process using a smoothing filter and the second smoothing process using an edge-preserving smoothing filter on the input image, other configurations may be used. For example, the display device 1 may be configured to perform the first smoothing process and not to perform the second smoothing process. For example, when the display device 1 determines in step S4 in the flowchart of FIG. 3 that smoothing is not to be performed, it may output the value of the target pixel in step S11.

The display device 1 may also be configured to perform the noise boundary direction determination process (step S24) and noise boundary position determination process (step S29) on the specific area 100 extracted from the input image and to perform image processing other than smoothing on the basis of the determined direction and position.

The display device 1 may also be configured not to perform the first smoothing process and to perform the second smoothing process. For example, after extracting the specific area 100 in step S2 of the flowchart in FIG. 3, the display device 1 may proceed to step S7 to perform a smoothing process using an edge-preserving smoothing filter. The display device 1 may also be configured not to determine whether to apply the result of the smoothing process using the edge-preserving smoothing filter. For example, the display device 1 may always apply the result of the smoothing process using the edge-preserving smoothing filter.

The display device 1 may also be configured to perform the edge strength calculation process (step S52), edge strength estimation process (step S53), and the like on the specific area 100 extracted from the input image, to perform the edge component direction determination process (step S56) on the basis of the results of these processes, and to perform image processing other than smoothing on the basis of the determined direction.

While the display device 1 has been described as an example of the device for eliminating or reducing noise in the input image in the present embodiment, a similar configuration may be applied to any other various types of image processing devices. For example, a similar configuration may be applied to display devices for displaying images related to a television broadcast received by a tuner or the like rather than input images from a PC. A similar configuration may also be applied to image processing devices for printing input images, such as printers and facsimiles.

Modification

Further, a configuration may be employed in which a PC performs decompression, the above noise elimination, and the like on an image and then inputs the noise-eliminated or reduced image to a display device. In this case, the above image processing may be performed when a computer program having the above image processing functions is provided to the CPU of a PC and then the CPU executes the computer program. The computer program may be recorded in a recording medium such as disk or memory card and then provided via a network such as the Internet.

Figure 25:
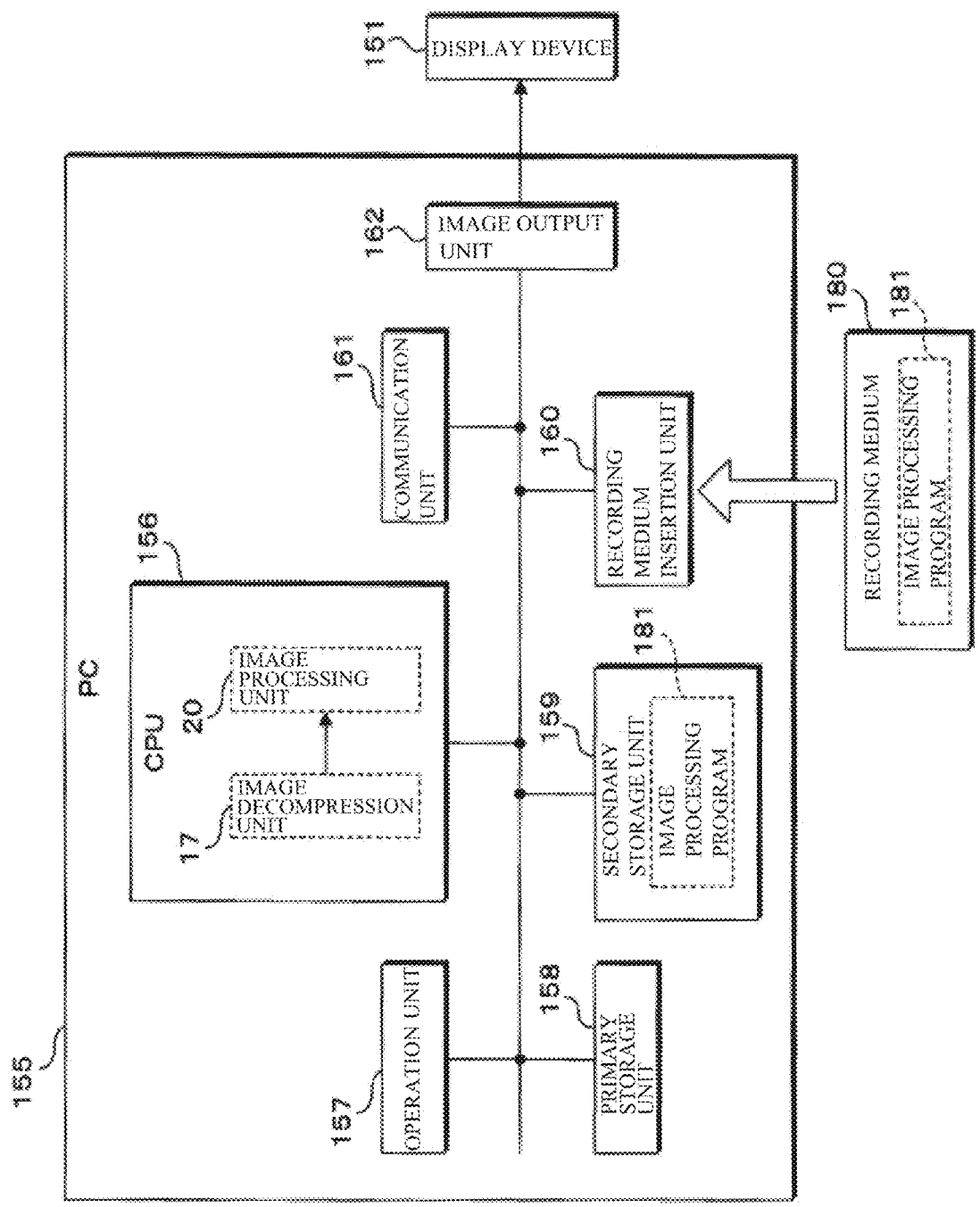
FIG. 25 is a block diagram showing the configuration of a PC of a modification.

FIG. 25 is a block diagram showing the configuration of a PC 155 of a modification. A PC 155 of the modification performs image processing such as decompression and noise elimination or reduction on an input image compressed using a scheme such as JPEG or MPEG and then outputs the resulting image to a display device 151. The display device 151 displays the input image from the PC 155 on a liquid crystal panel. The PC 155 includes a CPU 156, an operation unit 157, a primary storage unit 158, a secondary storage unit 159, a recording medium insertion unit 160, a communication unit 161, and an image output unit 162.

When the CPU 156 reads and executes an image processing program 181 stored in the secondary storage unit 159, the above image decompression unit 17, image processing unit 20, and the like are implemented as software function blocks. The operation unit 157 is an input unit such as a keyboard or mouse. It receives a user operation and notifies the CPU 156 of the user operation. The primary storage unit 158 includes a memory device such as static random access memory (SRAM) and temporarily stores various types of data used in processing performed by the CPU 156. The secondary storage unit 159 includes a storage unit such as a hard disk and stores various types of computer programs, such as the image processing program 181, and various types of data required to execute these computer programs. The recording medium insertion unit 160 is a unit such as a disk drive or memory card slot. A recording medium 180 such as a digital versatile disk (DVD) or memory card is inserted into the recording medium insertion unit 160 so that the computer program, data, and the like stored in the recording medium are read. The communication unit 161 communicates with other devices via a network such as the Internet wirelessly or by wire. The image output unit 162 outputs the image processed by the CPU 156 to the display device 151.

In the example shown in FIG. 25, the image processing program 181 is recorded in the recording medium 180 and then provided. When the recording medium 180 is inserted into the recording medium insertion unit 160, the CPU 156 of the PC 155 reads the image processing program 181 and the like stored in the recording medium 180 and stores them in the secondary storage unit 159. The CPU 156 acts as the image decompression unit 17, image processing unit 20, and like when executing the read image processing program 181. For example, when the operation unit 157 receives an instruction to display an image compressed using a scheme such as JPEG or MPEG, the CPU 156 reads that image, for example, from the secondary storage unit 159 and decompresses the image as the image decompression unit 17.

The CPU 156 then eliminates or reduces noise in the decompressed image as the image processing unit 20. Specifically, the image processing unit 20 extracts a specific area 100 including the target pixel from the decompressed image and determines whether to smooth the target pixel in the extracted specific area 100. If so determined, the image processing unit 20 smoothes the target pixel using a smoothing filter. If not so determined, the image processing unit 20 smoothes the target pixel using an edge-preserving smoothing filter, as well as determines whether to apply the result of such smoothing. The image processing unit 20 repeats this processes with respect to all the pixels in the image to generate an image by replacing the value of each pixel with one of a pixel value smoothed using a smoothing filter, a pixel value smoothed using an edge-preserving smoothing filter, and the original pixel value and then outputs this image. Thus, the image processing unit 20 can generate an output image in which stepwise noise such as block noise is eliminated or reduced.

DESCRIPTION OF NUMERALS

1 display device (image processing unit)
5 PC
11 control unit
12 operation unit
13 liquid crystal panel
14 backlight
15 light drive unit
16 image input unit
17 image decompression unit
18 panel drive unit
20 image processing unit (specific area extraction means, smoothing determination means, noise boundary position determination means, noise boundary direction determination means, specific area expansion means, first-order differential binarization means, first OR operation means, second-order differential binarization means, second OR operation means, third OR operation means, smoothing filter storage means, filter selection means, smoothing means, first smoothing means, second smoothing means, application determination means, Sobel filter storage means, edge strength calculation means, edge strength estimation means, edge direction determination means, edge-preserving smoothing filter storage means, edge strength difference determination means, second edge strength calculation means, edge strength determination means, increase/decrease frequency calculation means, increase/decrease frequency determination means, smoothing difference calculation means, smoothing difference determination means)
21 specific region extraction unit (specific area extraction means)
22 smoothing determination unit (smoothing determination means)
23 first smoothing unit (smoothing means, first smoothing means)
24 second smoothing unit (second smoothing means)
25 application determination unit (application determination means)
26 pixel value selection unit
100 specific area
101 horizontal first-order differential matrix
102 horizontal first-order differential OR column
103 horizontal second-order differential matrix
103a binarized horizontal second-order differential matrix
104 horizontal second-order differential OR column
105 horizontal OR column
106 horizontal upper OR value
107 horizontal lower OR value
108 horizontal determination result
111 vertical first-order differential matrix
112 vertical first-order differential OR row
113 vertical second-order differential matrix
114 vertical second-order differential OR row
115 vertical OR row
116 vertical upper OR value
117 vertical lower OR value
118 vertical determination result
151 display device
155 PC (image processing device)
156 CPU 157 operation unit
158 primary storage unit
159 secondary storage unit
160 recording medium insertion unit
161 communication unit
162 image output unit
180 recording medium
181 image processing program (computer program)

The invention claimed is:

1. An image processing device for eliminating or reducing noise from an input image comprising a plurality of pixels arranged in a matrix to generate an output image, the image processing device comprising:
   specific area extraction means configured to extract a specific area comprising a target pixel from the input image;
   smoothing determination means configured to determine whether to perform a first smoothing process on the target pixel, on the basis of the specific area extracted by the specific area extraction means;
   first smoothing means configured to, if the smoothing determination means determines that the first smoothing process is to be performed on the target pixel, perform the first smoothing process using a smoothing filter to smooth a value of the target pixel; and
   second smoothing means configured to, if the smoothing determination means determines that the first smoothing process is not to be performed on the target pixel, perform a second smoothing process using an edge-preserving smoothing filter to smooth the value of the target pixel,
   wherein the image processing device generates an output image by replacing a value of each pixel in the input image with either a pixel value smoothed by the first smoothing means or a pixel value smoothed by the second smoothing means.

2. The image processing device of claim 1, further comprising:
   noise boundary direction determination means configured to, if the smoothing determination means determines that the first smoothing process is to be performed on the target pixel, determine an extending direction of a boundary of noise in the specific area; and
   noise boundary position determination means configured to, if the smoothing determination means determines that the first smoothing process is to be performed on the target pixel, determine a position of the noise boundary in the specific area.

3. The image processing device of claim 2, further comprising specific area expansion means configured to, if the direction determined by the noise boundary direction determination means is not a predetermined direction, expand the specific area, wherein
   the noise boundary direction determination means re-determines the direction in the specific area expanded by the specific area expansion means.

4. The image processing device of claim 3, wherein expansion of the specific area by the specific area expansion means and determination of the direction by the noise boundary direction determination means are repeated until the direction determined by the noise boundary direction determination means becomes the predetermined direction or until a size of the specific area becomes a predetermined size.

5. The image processing device of claim 2, further comprising:
   smoothing filter storage means configured to store a plurality of smoothing filters used by the first smoothing means; and
   filter selection means configured to select a smoothing filter from the smoothing filters stored in the smoothing filter storage means on the basis of the position determined by the noise boundary position determination means and the direction determined by the noise boundary direction determination means,
   wherein the first smoothing means smoothes the value of the target pixel using the smoothing filter selected by the filter selection means.

6. The image processing device of claim 1, further comprising differential calculation means configured to calculate differentials between values of pixels in an image of the specific area extracted by the specific area extraction means,
   wherein the smoothing determination means determines whether to perform the smoothing process on the target pixel, on the basis of the differentials calculated by the differential calculation means.

7. An image processing device comprising:
   specific area extraction means configured to extract a specific area comprising a target pixel from an input image comprising a plurality of pixels arranged in a matrix;
   differential calculation means configured to calculate differentials between values of pixels in an image of the specific area extracted by the specific area extraction means; noise boundary direction determination means configured to determine an extending direction of a boundary of noise in the specific area on the basis of the differentials calculated by the differential calculation means; and
   noise boundary position determination means configured to determine a position of the noise boundary in the specific area on the basis of the differentials calculated by the differential calculation means.

8. An image processing method for eliminating or reducing noise from an input image comprising a plurality of pixels arranged in a matrix to generate an output image, the method comprising:
   a specific area extraction step of extracting a specific area comprising a target pixel from the input image;
   a smoothing determination step of determining whether to perform a first smoothing process on the target pixel, on the basis of the specific area extracted in specific area extraction step;
   a first smoothing step of, if it is determined in the smoothing determination step that the first smoothing process is to be performed on the target pixel, performing the first smoothing process using a smoothing filter to smooth a value of the target pixel;
   a second smoothing step of, if it is determined in the smoothing determination step that the first smoothing process is not to be performed on the target pixel, performing a second smoothing process using an edge-preserving smoothing filter to smooth the value of the target pixel; and
   a generation step of generating an output image by replacing a value of each pixel in the input image with either a pixel value smoothed in the first smoothing step or a pixel value smoothed in the second smoothing step.

9. The image processing method of claim 8, further comprising:
   a noise boundary direction determination step of, if it is determined in the smoothing determination step that the first smoothing process is to be performed on the target pixel, determining an extending direction of a boundary of noise in the specific area; and
   a noise boundary position determination step of, if it is determined in the smoothing determination step that the first smoothing process is to be performed on the target pixel, determining a position of the noise boundary in the specific area.

10. The image processing method of claim 9, further comprising a specific area expansion step of, if the direction determined in the noise boundary direction determination step is not the predetermined direction, expanding the specific area,
wherein the noise boundary direction determination step comprises re-determining the direction in the specific area expanded in the specific area expansion step.

11. The image processing method of claim 10, wherein expansion of the specific area in the specific area expansion step and determination of the direction in the noise boundary direction determination step are repeated until the direction determined in the noise boundary direction determination step becomes the predetermined direction or until a size of the specific area extraction becomes a predetermined size in the specific area expansion step.

12. The image processing method of claim 9, wherein a plurality of smoothing filters used in the first smoothing step are previously stored, the method further comprising a filter selection step of selecting a smoothing filter from the stored smoothing filters on the basis of the position determined in the noise boundary position determination step and the direction determined in the noise boundary direction determination step, wherein
the first smoothing step comprises smoothing the value of the target pixel using the smoothing filter selected in the filter selection step.

13. The image processing method of claim 8, further comprising a differential calculation step of calculating differentials between values of pixels in an image of the specific area extracted in the specific area extraction step,
wherein the smoothing determination step comprises determining whether to perform the smoothing process on the target pixel, on the basis of the differentials calculated in the differential calculation step.

14. An image processing method comprising:
a specific area extraction step of extracting a specific area comprising a target pixel from an input image comprising a plurality of pixels arranged in a matrix;
a differential calculation step of calculating differentials between values of pixels in an image of the specific area extracted in the specific area extraction step;
a noise boundary direction determination step of determining an extending direction of a boundary of noise in the specific area on the basis of the differentials calculated in the differential calculation step; and
a noise boundary position determination step of determining a position of the noise boundary in the specific area on the basis of the differentials calculated in the differential calculation step.

\* \* \* \* \*